United States Patent
Naumann Zu Koenigsbrueck et al.

(10) Patent No.: US 12,206,675 B2
(45) Date of Patent: *Jan. 21, 2025

(54) PRE-AUTHORIZATION ACCESS REQUEST SCREENING

(71) Applicant: Visa International Service Association, San Francisco, CA (US)

(72) Inventors: Andrew John Bruno Naumann Zu Koenigsbrueck, Princeton, NJ (US); Ali Chamseddine, London (GB); Cory Howard Siddens, Mountain View, CA (US); Benjamin Scott Boding, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,018

(22) Filed: Jan. 11, 2024

(65) Prior Publication Data

US 2024/0154969 A1    May 9, 2024

Related U.S. Application Data

(63) Continuation of application No. 17/263,527, filed as application No. PCT/US2019/012547 on Jan. 7, 2019, now Pat. No. 11,916,917.

(Continued)

(51) Int. Cl.
*H04L 9/40* (2022.01)
*G06F 21/10* (2013.01)

(52) U.S. Cl.
CPC ............ *H04L 63/102* (2013.01); *G06F 21/10* (2013.01)

(58) Field of Classification Search
CPC ....... H04L 63/102; H04L 63/10; G06F 21/10; G06F 21/604; H04W 12/08
(Continued)

(56) References Cited

U.S. PATENT DOCUMENTS 8,601,531 B1 * 12/2013 Zolfonoon ............ G06F 21/604
                                                          726/4
9,367,844 B1    6/2016 Hu et al.
(Continued)

FOREIGN PATENT DOCUMENTS

WO    2007134433 A1    11/2007

OTHER PUBLICATIONS

Notice of Allowance, mailed Oct. 12, 2023, for U.S. Appl. No. 17/263,527, 17 pages.
(Continued)

*Primary Examiner* — Teshome Hailu
(74) *Attorney, Agent, or Firm* — Kilpatrick Townsend & Stockton LLP

(57) ABSTRACT

Systems and methods are described for pre-authentication access request screening. A server computer may receive a request for access to a resource comprising access data. The server computer may transmit, to an authentication computer, an authentication request message comprising at least a subset of the access data and receive an authentication response message comprising authentication data. The server computer may determine an access score based on the authentication data. Alternatively, the server computer may determine the access score based on the access data without using/receiving authorization data. The server computer may generate an access indicator based on the access score. The server computer may prepare and transmit an authorization request message comprising the access indicator to an authorization computer. The authorization computer may
(Continued)

approve or decline the access to the resource based on the access indicator.

18 Claims, 15 Drawing Sheets

Related U.S. Application Data

(60) Provisional application No. 62/712,909, filed on Jul. 31, 2018.

(58) Field of Classification Search
USPC .......................................................... 726/28
See application file for complete search history.

(56) References Cited

U.S. PATENT DOCUMENTS

| | | | |
|---|---|---|---|
| 9,996,837 B2 | 6/2018 | Siddens et al. | |
| 10,389,731 B2* | 8/2019 | DiAcetis | H04L 63/10 |
| 11,368,433 B1* | 6/2022 | Clemons | H04L 63/0236 |
| 11,677,547 B1* | 6/2023 | McDonald | H04L 9/3247 |
| | | | 713/171 |
| 2003/0074580 A1 | 4/2003 | Knouse et al. | |
| 2005/0144452 A1 | 6/2005 | Lynch et al. | |
| 2007/0106582 A1 | 5/2007 | Baker et al. | |
| 2011/0016534 A1* | 1/2011 | Jakobsson | H04L 67/535 |
| | | | 726/28 |
| 2015/0089585 A1 | 3/2015 | Novack | |
| 2015/0227936 A1 | 8/2015 | Bruesewitz et al. | |
| 2017/0076518 A1 | 3/2017 | Patterson et al. | |
| 2018/0137504 A1 | 5/2018 | Goldenberg et al. | |
| 2018/0204215 A1 | 7/2018 | Hu et al. | |
| 2020/0007536 A1* | 1/2020 | Piel | G06Q 20/401 |
| 2021/0144134 A1* | 5/2021 | Kurylko | H04L 63/0869 |

OTHER PUBLICATIONS

Extended European Search Report, mailed Jul. 20, 2021, for EP Patent Application No. EP19843962.2, 7 pages.

International Preliminary Report on Patentability, mailed Feb. 11, 2021, for International Patent Application No. PCT/US2019/012547, 6 pages.

International Search Report and Written Opinion, mailed May 1, 2019, for International Patent Application No. PCT/US2019/012547, 10 pages.

Notice of Decision to Grant, mailed Nov. 15, 2023, for Singapore Patent Application No. SG11202100775X,, 4 pages.

* cited by examiner

PRE-AUTHORIZATION ACCESS REQUEST SCREENING

CROSS-REFERENCE TO RELATED APPLICATION

This application is a continuation of U.S. patent application Ser. No. 17/263,527, filed Jan. 26, 2021, which is a 371 National Phase application of International Application No. PCT/US2019/012547 filed Jan. 7, 2019, which claims priority to U.S. Provisional Application No. 62/712,909, filed on Jul. 31, 2018, the contents of which are incorporated by reference herein in their entirety.

BACKGROUND

An unauthorized user may fraudulently request access to a resource using the authorization information of an authorized user. To prevent unauthorized access, a system may implement a fraud check using access rules to reject access requests having certain parameters that are indicative of fraud.

Multiple computers may be involved in routing and processing electronic communications as part of providing access to a resource. For example, an authentication check may be executed to authenticate the user, fraud checks may be executed, and/or authorization checks may be executed (e.g., based on data such as payment credentials). One or more of these checks may be executed by one or more different entities. Difficulties in coordination and communication between these various computers can delay and frustrate such a process for providing access to the resource.

Embodiments address these and other problems, individually and collectively.

BRIEF SUMMARY

Embodiments include methods as well as systems that perform fraud checks and/or authentication operations prior to authorization. Results of such pre-authorization access request screenings may be transmitted to an authorization computer for determining whether to grant access to a resource.

One embodiment is directed to a method comprising: receiving, by a server computer, a request for access to a resource, the request comprising access data; determining, by the server computer, an access score based on the access data; generating, by the server computer, an access indicator based on the access score; preparing, by the server computer, an authorization request message comprising the access indicator; and transmitting, by the server computer to an authorization computer, the authorization request message comprising the access indicator; wherein the authorization computer approves or declines the access to the resource based on the access indicator comprised in the authorization request message.

Another embodiment is directed to a system comprising a computer programmed to perform the above-noted method.

Another embodiment is directed to a computer product storing a plurality of instructions for performing the above-noted method.

Another embodiment is directed to a method comprising: receiving, by a server computer, a request for access to a resource, the request comprising access data; transmitting, by the server computer to an authentication computer, an authentication request message comprising at least a subset of the access data; receiving, by the server computer from the authentication computer, an authentication response message comprising authentication data, wherein the authentication computer generated the authentication data based on the access data; and determining, by the server computer, an access score based on the authentication data.

Another embodiment is directed to a system comprising a computer programmed to perform the above-noted method.

TERMS

Figure 1:
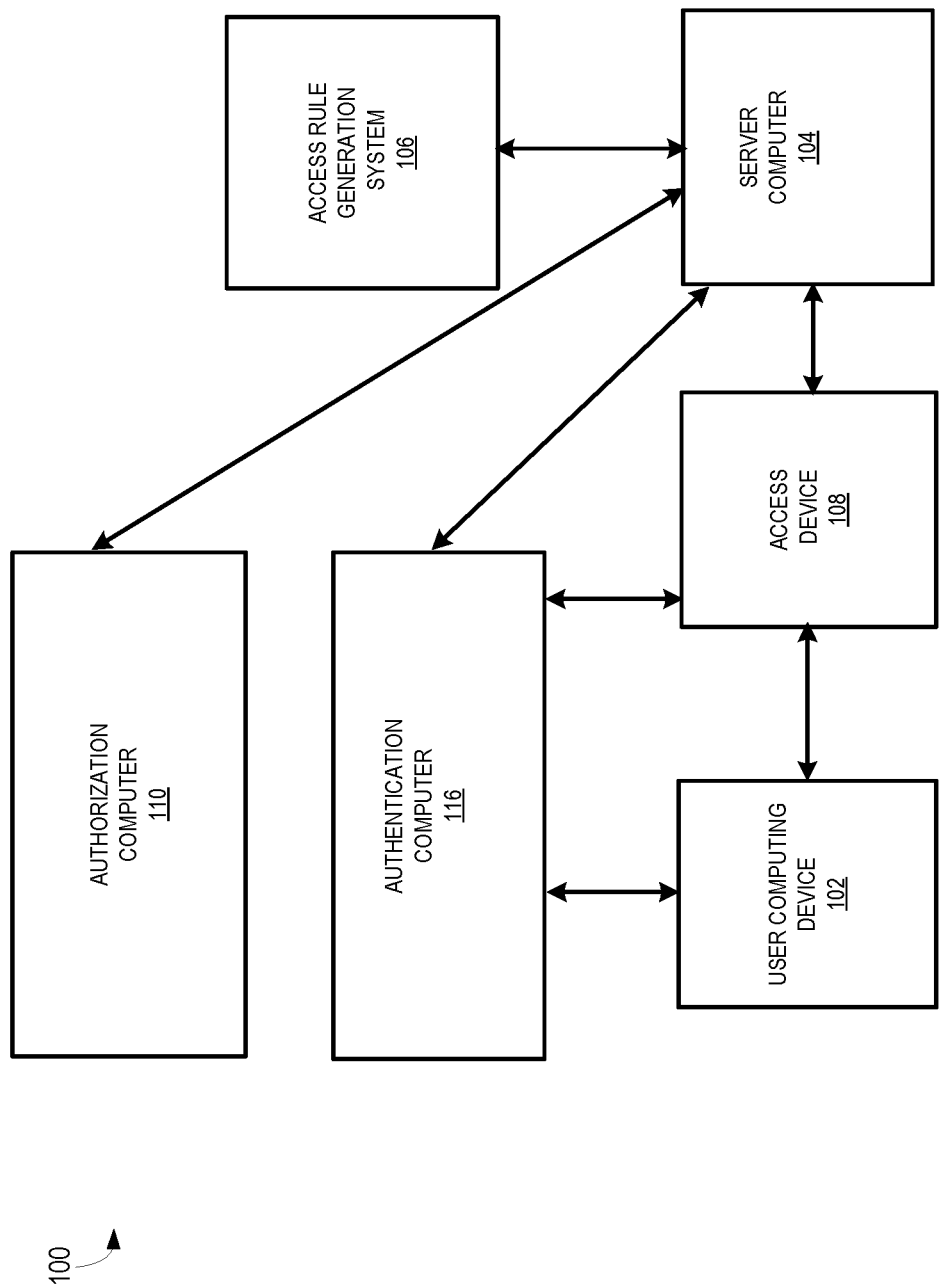
FIG. 1 shows a system for pre-authorization access request screening, in accordance with some embodiments.

Prior to discussing various embodiments, descriptions of some terms may be helpful in providing a better understanding.

The term "user" may refer to an individual or entity. The user may be an individual interacting with a user computing device (e.g., a mobile phone or tablet). The user may be a consumer or business that is associated with an account and whose account can be used to conduct transactions, including a payment transaction.

The term "user computing device" may refer to a device that can be used to communicate with another device or system. It can include a user computing device that is used to conduct a transaction. The user computing device may be capable of conducting communications over a network. A user computing device may be in any suitable form. For example, suitable user computing devices can be hand-held and compact so that it can fit into a user's wallet and/or pocket (e.g., pocket-sized). The user computing device can include a processor, and memory, input devices, and output devices, operatively coupled to the processor. Specific examples of user computing devices include cellular or mobile phones, tablet computers, desktop computers personal digital assistants (PDAs), pagers, portable computers, smart cards, and the like. Additional user computing devices may include wearable devices, such as smart watches, glasses fitness bands, ankle bracelets, rings, earrings, etc. In some embodiments, the user computing device may include automobiles with remote communication capabilities.

The term "user data" may include data regarding a user. User data may include a name, mailing address, shipping address, phone number, payment account number, date of birth, marital status, income, social security number, demographic data, etc. In some embodiments, user data may also include user preferences, notification methods, and prior transaction history.

The term "resource" generally refers to any asset that may be used or consumed. For example, the resource may be an electronic resource (e.g., stored data, received data, a computer account, a network-based account, an email inbox), a physical resource (e.g., a tangible object, a building, a safe, or a physical location), or other electronic communications between computers (e.g., a communication signal corresponding to an account for performing a transaction).

An "access device" may be any suitable device for obtaining access to a resource. An access device may generally be located in any suitable location, such as at the location of a merchant. An access device may be in any suitable form. Some examples of access devices include point of sale (POS) devices, cellular phones, personal digital assistants (PDAs), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a portable device.

"Access data" may include any suitable data that can be used to access a resource or create data that can access a resource. As an example, the resource may be a location and the access data may include data that can be used to access the location, such as ticket information for an event, data to access a building, transit ticket information, etc. As another example, access data could include data that can be used to obtain a resource. As another example, access data may be account information for a payment account. Account information may include a primary account number (PAN), payment token, expiration date, verification values, etc. Access data may further include user data, as described above.

The term "access request" generally refers to a request to access a resource. The access request may be received from a requesting computer, a user device, or a resource computer, for example. The access request may include access data, as described above. The access request may also include and access data, such as an access request identifier, a resource identifier, a timestamp, a date, a device or computer identifier, a geo-location, or any other suitable information.

The term "access rule" may include any procedure or definition used to determine an access rule outcome for an access request based on certain criteria. In some embodiments, the rule may comprise one or more rule conditions and an associated rule outcome. A "rule condition" may specify a logical expression describing the circumstances under which the outcome is determined for the rule. A condition of the access rule may relate to an access request data element based on the data element having a specific value, based on the value being within a certain range, based on the value being above or below a threshold, or any combination thereof.

The term "identifier" may refer to any information that may be used to identify information. In some embodiments, the identifier may be a special value generated randomly or according to a predetermined algorithm, code, or shared secret. For example, an authorizing entity identifier may be a value or number associated with a authorizing entity (e.g., a bank identification number). In another example, an account identifier may be used to uniquely identify an account. In some embodiments, the identifier may be one or more graphics, a token, a bar code, a Quick Response (QR) code, or any other information that may be used to uniquely identify an entity.

The term "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol) for access to a computer system or a venue.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

A "risk level" may include results of a risk analysis or evaluation. A risk level may be in the form of a numeric or an alphanumeric value, such as a number from 1-10 or a letter from A-Z. A risk level may indicate a relative degree of risk in a particular situation, such as a transaction. In some cases, a higher risk level may indicate high risk, while a lower risk level may indicate low risk.

The term "initiating" may include the first steps taken in order to begin a process or the steps conducted in order to complete a process. For example, "initiating an authorization process for the transaction" can refer to the actual process required to authorize the transaction. However, "initiating an authorization process for the transaction" can also refer to the process of sending a message from one computer to another computer, with instructions for performing the process required to authorize the transaction.

The term "authorization process" may include a process for authorizing access to a resource. In some embodiments, an authorization process involves a authorizing computer associated with a resource. In some embodiments, the authorization process may involve the generation and sending of authorization request messages to an authorizing computer to authorize user access to a resource associated with the authorizing computer, and an authorization response message from the issuer computer indicating an authorization or rejection of the access request.

The term "authentication process" may refer to a process for performing authentications. The authentication process may be used to authenticate a user or a transaction. In some embodiments, the authentication process may be an active authentication where a user is prompted to provide access data (e.g., a password, token). In other embodiments, the authentication process may be a passive authentication where the user is not prompted to provide access data. In such embodiments, data may be retrieved from a user computing device (e.g., geolocation data) and compared to expected data.

The term "authentication data" may refer to data generated and/or processed in association with authentication. Authentication data may indicate an authentication result (e.g., whether the user has been authenticated). Authentication data may include a code indicating the authentication result ("authentication code"). Authentication data may further include detailed information generated in the authentication process. As an example, authentication data may include biometric data used to arrive at an authentication result.

DETAILED DESCRIPTION

Determining whether to grant access to a resource may involve multiple phases. First, a secure authentication process may be executed to authenticate the user (e.g., based on confirming the user is who she claims to be). Subsequently, an authorization process may be executed to authorize the access to the resource (e.g., based on resource access data such as payment credentials). Additionally, one or more fraud checks may be performed. These processes may involve similar data sets and analyses. However, the processes may be performed in a disjoint fashion, resulting in duplicative work and unnecessary data storage.

In step-up authentication, a user may be prompted to enter additional information such as a password or token. However, resource providers are increasingly migrating to risk-based authentication due in part to a desire to decrease friction on the user. The resource provider may implement a rule-based system to authenticate the user based on analyzing details of the access request. This may obviate the need for the user to be challenged to enter additional information. Risk-based authentication may involve generating a rich data set.

Access requests may be selectively sent to an authentication computer for authentication. Sometimes, the access requests selected for authentication may be more "risky" or more likely to be fraudulent. However, it is not necessarily the case that simply because an access request has been selected for authentication, the access request is more likely to be fraudulent. Resource providers are feeling the brunt of liability for fraudulent access due to the adoption of risk-based modeling. Without actual step-up, authorization systems may place authenticated access requests under increased scrutiny. The increased scrutiny results in more false positives, i.e., no access even when the request was not fraudulent.

Systems and methods disclosed herein provide an authorizing entity such as an issuer with an access indicator for use in determining whether to grant a user access to a resource. The access indicator may be generated based on received access data. The system may determine a level of risk associated with the access request. This risk analysis may involve using a set of predictive rules. These rules may be applied to the access data to arrive at an access score quantifying the risk level of the access request.

Based on the access score, the access indicator may or may not be passed to the authorizing entity. The system may determine whether to pass the access indicator by comparing the access score (i.e., risk level) to a threshold value. For example, the system may use a threshold value which represents an acceptable value of the access score. If the access score meets or exceeds the threshold value, then the system may pass the access indicator to the authorizing entity. The access indicator may be passed to the authorizing entity, for example, by including a flag in a particular field of an authorization request message transmitted to the authorizing entity. The presence of the flag may signal to the authorizing entity that the access request has passed the risk screening and/or should be approved.

In some embodiments, the system may leverage authentication data generated by an authentication computer in determining whether to authenticate the user. As examples of authentication data, an authentication computer may generate authentication codes (e.g., a numerical value indicating whether the user is authenticated), authentication cryptograms (e.g., a cryptogram that uniquely identifies an authenticated access request), data generated in the course of risk-based authentication (e.g., details of the user's past activities), etc. This authentication data may be used in determining an access score and/or access indicator.

Advantageously, the authorization computer can leverage the data and computations that were already performed in the authentication and/or risk screening processes in evaluating an access request. The authorization computer may be able to reduce or even eliminate the amount of computations required, saving time and computational resources. This may, in turn, increase confidence and improve authorization rates. With the assurance that a trusted entity has already screened the access request for fraud, the resource providers may be more inclined to authorize an access request. Further, by leveraging the preexisting authorization request message to pass authentication and/or risk data, there is no need to burden the system with additional messaging operations.

I. SYSTEMS FOR PRE-AUTHORIZATION ACCESS REQUEST SCREENING

A. System Overview

FIG. 1 illustrates an overview of a system for pre-authorization access request screening. The system may receive requests from users to access a resource. The system may include an authentication computer for determining whether to authenticate the user. The system may further include an authorization computer for determining whether to authorize access to the resource. The system may further include a server computer which executes risk checks and passes useful information, such as an access indicator, to the authorization computer.

The system 100 in FIG. 1 includes a user computing device 102, an access device 108, a server computer 104, an access rule generation system 106, an authentication computer 116, and an authorization computer 110. Each of these systems and computers may be in operative communication with each other via any suitable communication medium (including the Internet), using any suitable communications protocol.

For simplicity of illustration, a certain number of components are shown in FIG. 1. It is understood, however, that embodiments may include more than one of each component. In addition, some embodiments may include fewer than or greater than all of the components shown in FIG. 1.

The user computing device 102 may be in any suitable form. For example, suitable user computing devices may be hand-held and compact so that they can fit into a user's pocket. Examples of user computing device 102 may include any device capable of accessing the Internet. Specific examples of user computing devices 102 include cellular or wireless phones (e.g., smartphones), tablet phones, tablet computers, laptop computers, desktop computers, personal digital assistants (PDAs), pagers, portable computers, smart cards, and the like.

The user computing device 102 may accept input from a user comprising access data, in association with a user attempt to access a resource. The resource may, as nonlimiting examples, be a physical resource (e.g., a building or a lockbox) or an electronic resource (e.g., a local computer account, digital files or documents, a network database, an email inbox, a payment account, or a website login). As examples, the access data may include one or more of a user name, an account number, a token, a password, a personal identification number, a signature, and/or a digital certificate. The user computing device 102 may transmit the access data, in whole or in part, to the access device 108. Alternatively, or additionally, the user computing device 102 may transmit the access data to the server computer 104.

The access device 108 may include any suitable computational apparatus for controlling access to a resource. As examples, the access device 108 may be a point-of-sale device, a lockbox on a door, or a secure website. The access device 108 may, directly or via the user computing device 102, receive access data for accessing a resource. Based on the access data, the access device 108 may prepare a request for access to the resource. The access device 108 may transmit a request for access to the resource, comprising some or all of the received access data, to the server computer 104.

The access device 108 and/or the user computing device 102 may include a user input interface such as a keypad, a keyboard, a finger print reader, a retina scanner, any other type of biometric reader, a magnetic stripe reader, a chip card reader, a radio frequency identification reader, or a wireless or contactless communication interface, for example.

In one example, a user may enter one or more of an account number, a personal identification number, and/or a password into the access device 108, to request access to a physical resource (e.g., to open a locked security door in order to access a building). The access device 108, or a separate computer operatively connected to the access device 108, may generate and send an access request to the server computer 104 to request access to the resource.

In another example, a user may operate the user computing device 102 to request access to an electronic resource (e.g., a website or a file). Such a request can be transmitted to access device 108 from user computing device 102, which can forward the request to server computer 104. The request can be transmitted wirelessly and may be encrypted. The request can be sent in response to user input at screen or voice command, or initiated by a gesture, e.g., by tapping a phone to a terminal The access rule generation system 106 may generate access rules 104H for the server computer 104 based on the access data. The access rule generation system may determine the access rules based on historical data about previous access requests, statistical models, and/or machine learning algorithms. The server computer 104 may define and/or provide guidelines for rules to be evaluated by the access rule generation system 106. Methods for generating access rules are described in detail in U.S. Pat. No. 9,853,993 B1, "Systems and Methods for Generation and Selection of Access Rules," which is hereby incorporated by reference herein in its entirety.

The authentication computer 116 may be configured to validate (or authenticate) the user and/or an account associated with the user. The authentication computer 116 is described in further detail below with respect to FIG. 2B.

The authorization computer 110 may control access to a resource (such as a physical or electronic resource). The authorization computer 110 may, for example, be associated with a secure website, and maintain a database of access data suitable for granting access to the website. As another example, the authorization computer 110 may be associated with an issuer (e.g., a bank) which issues and maintains user accounts for users, and determines whether users have adequate funds to complete a transaction. Alternatively, the authorization computer 110 may be a service provider that is different from the resource provider. The authorization computer 110 may include a processor and a computer-readable medium coupled to the processor, the computer-readable medium comprising code, executable by the processor for performing the functionality described herein.

The authorization computer 110 may include functionality to receive an authorization request message. The authorization computer 110 may then grant or deny access to the resource based on the authentication data, and/or other information received from the server computer 104, such as an access indicator, described below with respect to FIG. 2A.

Some entities can perform both authorization computer 110 and authentication computer 116 functions (e.g., a resource provider system that controls access to one or more resources). Embodiments encompass such single entity computers that may perform one or more of the functions described herein.

B. Server Computer

Figure 2A:
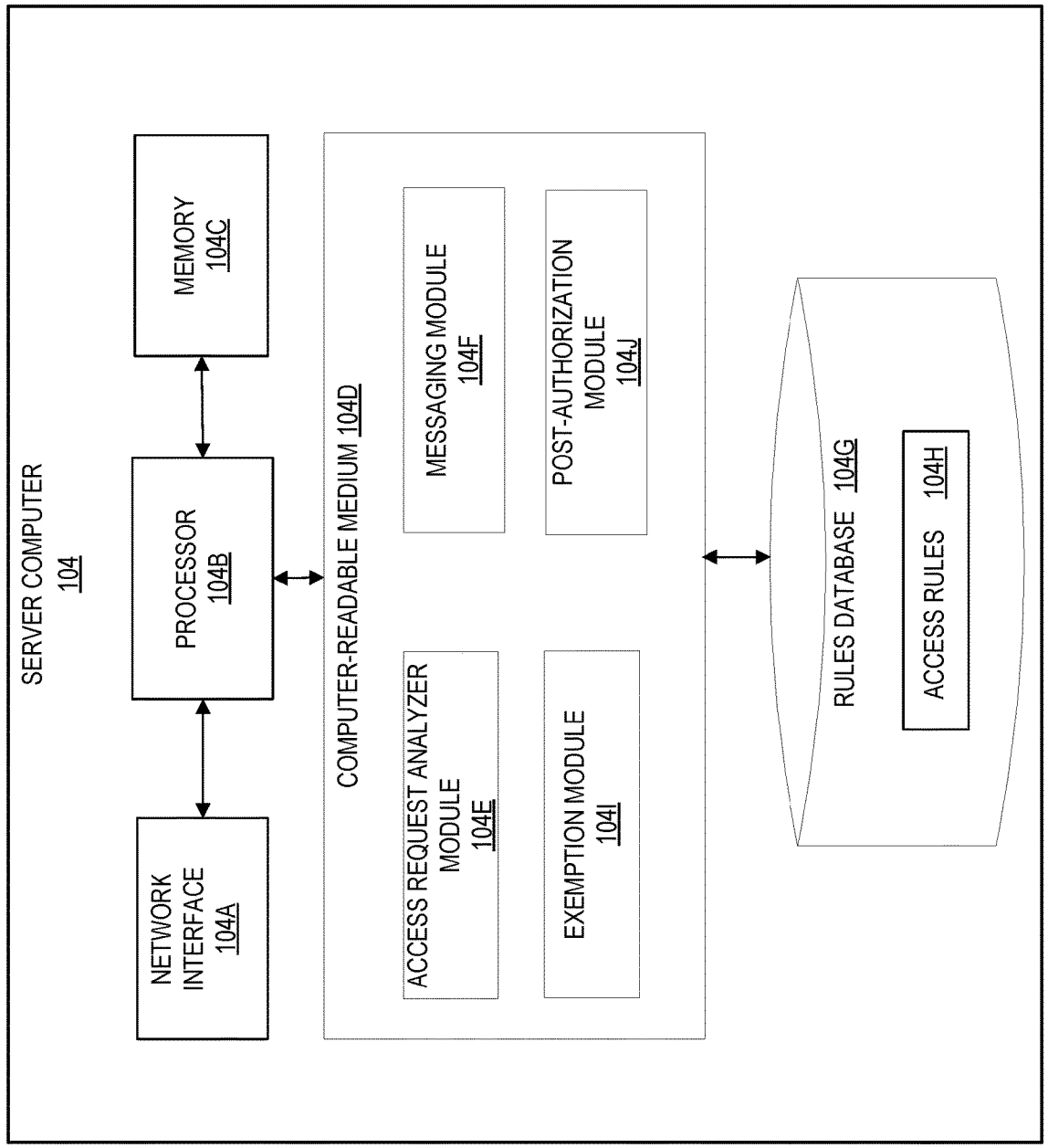
FIG. 2A shows a block diagram of a server computer, in accordance with some embodiments.

In some embodiments, the server computer 104 may be configured to manage and evaluate access requests. The server computer 104, as depicted in FIG. 2A, may include a network interface 104A, a processor 104B, a memory 104C, and a computer-readable medium 104D coupled to the processor 104B. The computer-readable medium 104D may comprise code, executable by the processor 104B for performing the functionality described herein. The server computer 104 may further comprise or be communicatively coupled to a rules database 104G.

The rules database 104G may be a storage unit and/or device (e.g., a file system, database, collection of tables, or other storage mechanism) for storing data. The rules database 104G may include multiple different storage units and/or devices. The rules database 104G may store one or more access rules 104H. The access rules 104H may specify criteria for identifying a fraudulent access request. Each of the access rules 104H may include one or more conditions corresponding to one or more parameters of the access request.

The network interface 104A can be configured to connect to one or more communication networks to allow the server computer 104 to communicate with other entities such as the authentication computer 116, the authorization computer 110, the access rule generation system 106, etc.

The processor 104B may be implemented as one or more integrated circuits (e.g., one or more single core or multicore microprocessors and/or microcontrollers). The processor 104B may be used to control the operation of the server computer 104. The processor 104B can execute a variety of programs in response to program code or computer-readable code stored in memory 104C. The processor 104B may include functionality to maintain multiple concurrently executing programs or processes.

The memory 104C may be implemented using any combination of any number of non-volatile memories (e.g., flash memory) and volatile memories (e.g., DRAM, SRAM), or any other non-transitory storage medium, or a combination of media.

The computer-readable medium 104D may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 104D may be any combination of such storage or transmission devices.

The computer-readable medium 104D may comprise software code stored as a series of instructions or commands The computer-readable medium 104D may comprise an access request analyzer module 104E, a messaging module 104F, an exemption module 104I, and a post-authorization module 104J.

The access request analyzer module 104E may comprise code for determining an access score based on access rules applied to the access data, authentication data, and/or access data. The access score may correspond to a likelihood of the access request being fraudulent. For example, the access score may be a numerical value from 0 (almost certainly not fraudulent) to 10 (almost certainly fraudulent). The access score may increase proportionally with the risk level of the access request, as with the previous example. Alternatively, the access score may vary inversely with the risk level of the access request (e.g., an access score of 100 corresponds to the most trusted access requests, while an access score of 0 corresponds to the most risky access requests). If the access score indicates that the access request is likely to be fraudulent, then the server computer 104 may reject the access request and/or recommend that another entity (e.g., the authorization computer 110) decline the access request.

The access request analyzer module 104E may further be configured to generate an access indicator, based in whole or in part on the access score. The access indicator may be a flag to be inserted in a message. The access indicator may indicate whether the server computer approves the request for access to the resource The access indicator may further indicate a guarantee for the access request on the part of an entity associated with the server computer 104. For example, a merchant or building security company managing the server computer 104 may guarantee the decisions made by the server computer 104. The guarantee may be a financial guarantee for any losses incurred by a fraudulently gained access and/or an assurance of restitution.

The access request analyzer module 104E may further be configured to identify one of a plurality of profiles corresponding to an access request. The access request analyzer module 104E may use a stored mapping to do so. For example, access data such as transaction amount, location, and/or time of day may be mapped to profiles. The profiles may be correlated with risk. For example, payment transactions with higher values may be associated with a higher level of risk and therefore be subject to increased scrutiny.

The messaging module 104F may comprise code for preparing and transmitting messages. The messaging module 104F may further be configured to accept and analyze messages (e.g., authentication response messages). The messaging module 104F may include functionality to generate authentication request messages and authorization request messages. The messaging module 104F may be configured to prepare the messages to contain information generated by the access request analyzer module and/or received in an authentication response message, such as authentication data, access scores, access indicators, etc. The messaging module 104F may include functionality to transmit authentication request messages and authorization request messages.

The exemption module 104I may comprise code for determining whether to apply an exemption. An exemption may be applied causing the system to skip or execute limited authentication operations. Exemptions may be applied based on configurable rules. For example, exemptions may apply for transactions below a threshold amount, whitelists, based on risk rules, and/or the like.

The post-authorization module 104J may comprise code for evaluating an access request post-authorization. In some cases, although the authorization computer has approved access to a resource, the post-authorization module 104J may determine to decline the access request. For example, the authorization operations may reveal that certain credentials are invalid, in which case the post-authorization module 104J may determine, post-authorization, that an access request should be declined.

The access request analyzer module 104E may be communicatively coupled to an access rule generation system 106, which determines the access rules, as described above. The access request analyzer module 104E may include an Application Programming Interface (API) for transmitting rule guidelines to the rule generation system.

C. Authentication Computer

Figure 2B:
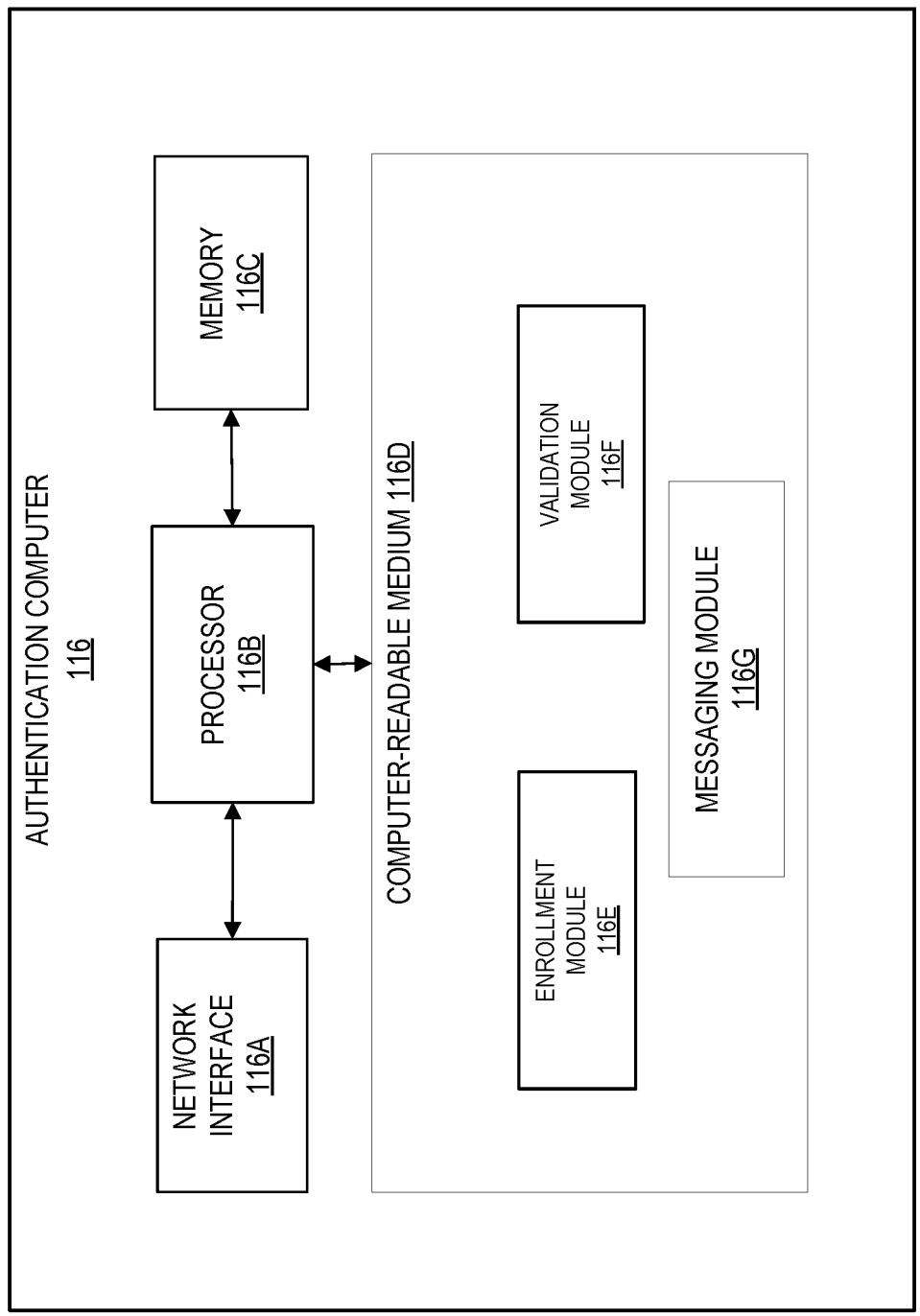
FIG. 2B shows a block diagram of an authentication computer, in accordance with some embodiments.

In some embodiments, the authentication computer 116 may be configured to authenticate a user making an access request. The authentication computer 116, as depicted in FIG. 2B, may include a network interface 116A, a processor 116B, a memory 116C, and a computer-readable medium 116D coupled to the processor 116B. The computer-readable medium 116D may comprise code, executable by the processor 116B for performing the functionality described herein.

The network interface 116A can be configured to connect to one or more communication networks to allow the authentication computer 116 to communicate with other entities such as the server computer 104, the user computing device 102, the access device 108, etc.

The processor 116B may be substantially similar to processor 104B, described above with respect to FIG. 2A. The memory 116C may be substantially similar to the memory 104C, described above with respect to FIG. 2A.

The computer-readable medium 116D may comprise one or more non-transitory media for storage and/or transmission. Suitable media include, as examples, a random access memory (RAM), a read only memory (ROM), a magnetic medium such as a hard-drive or a floppy disk, or an optical medium such as a compact disk (CD) or DVD (digital versatile disk), flash memory, and the like. The computer-readable medium 116D may be any combination of such storage or transmission devices.

The computer-readable medium 116D may comprise software code stored as a series of instructions or commands. The computer-readable medium 116D may comprise an enrollment module 116E, a validation module 116F, and a messaging module 116G.

The enrollment module 116E may comprise code for determining an enrollment status of the one or more parties in service associated with an enhanced authentication protocol. The enrollment status may be determined based on identifier received in an authorization request message. For example, the enrollment status of an issuer may be determined based on a Bank Identification Number (BIN). The enrollment module 116E may access a stored mapping of BINs to entities enrolled in an authentication system.

The validation module 116F may include functionality to authenticate a user and/or account. The validation module 116F may authenticate the user based on data received in an authentication request message, such as access data. In some embodiments, the access data may be provided by the user computing device 102, the access device 108, and/or the server computer 104. For example, the access data may include one or more of: a time that the access request was received, a day of the week that the access request was received, the source-location of the access request, the amount of resources requested, an identifier of the resource being requested, an identifier of the user, access device 108, and/or user computing device 102, a location of the user, access device 108, and/or user computing device 102, an indication of the requested use of the resource, and/or an indication of the type, status, amount, or form of the resource being requested. Alternatively, or additionally, the validation module 116F may generate access data based on received information. As an example, the validation module 116F may compute a new value based on a set of timestamps retrieved from an access device 108. The validation module 116F may verify the access data based on information stored at the authentication computer 116 and/or server computer 104.

The validation module 116F may generate authentication data. The authentication data may indicate an authentication result (e.g., whether the user has been authenticated). The authentication data may further include detailed information generated in the authentication process, such as an authentication code, an authentication cryptogram, and/or supplemental data, as described below.

The authentication data may include an authentication code. An authentication code may be a numerical value indicating the authentication results. For example, in financial transactions, an Electronic Commerce Indicator (ECI) code is used to indicate whether a user has been authenticated. As a specific example, an ECI value of 5 may indicate that the user was authenticated. An ECI value of 01 may indicate that authentication could not be completed. Alternatively, or additionally, the ECI code may be a word or letter (e.g., "A" or "Auth" for authenticated; "N" or "Rejected" for not authenticated, etc.).

The authentication data may further include an authentication cryptogram. The authentication cryptogram may be a cryptogram for validating the integrity of access data. The authentication cryptogram may be a unique value for the access request. As non-limiting examples, the authentication cryptogram may be a Cardholder Authentication Verification Value (CAVV) or an Accountholder Authentication value (AAV).

The authentication data may further include detailed information ("supplemental data") generated and/or analyzed by the authentication computer 116 in the authentication process. As examples, the supplemental data may comprise token-based authentication data, biometric authentication data, data corresponding to previous user behaviors (e.g., access attempts or locations associated with the user), etc.

The messaging module 116G may include functionality to receive an authentication request message from the server computer 104 and to transmit an authentication response message to the server computer 104.

II. PRE-AUTHORIZATION ACCESS REQUEST SCREENING

FIGS. 3-7 illustrate several variations on methods for pre-authorization access request screening. In each case, the system leverages a pre-authorization access request screening to transmit information to an authorization computer. The authorization computer may then use the received information to determine whether to approve or decline access to a resource. The pre-authorization access request screening may comprise authentication operations resulting in authentication data, as described with respect to FIGS. 3-5. Alternatively, or additionally, the system pre-authorization access request screening may comprise fraud checks used to generate an access indicator, which provides a simple indication whether the access request should be approved or declined, as described with respect to FIGS. 6-7.

A. Using Authentication Codes and Authentication Cryptograms

Figure 3:
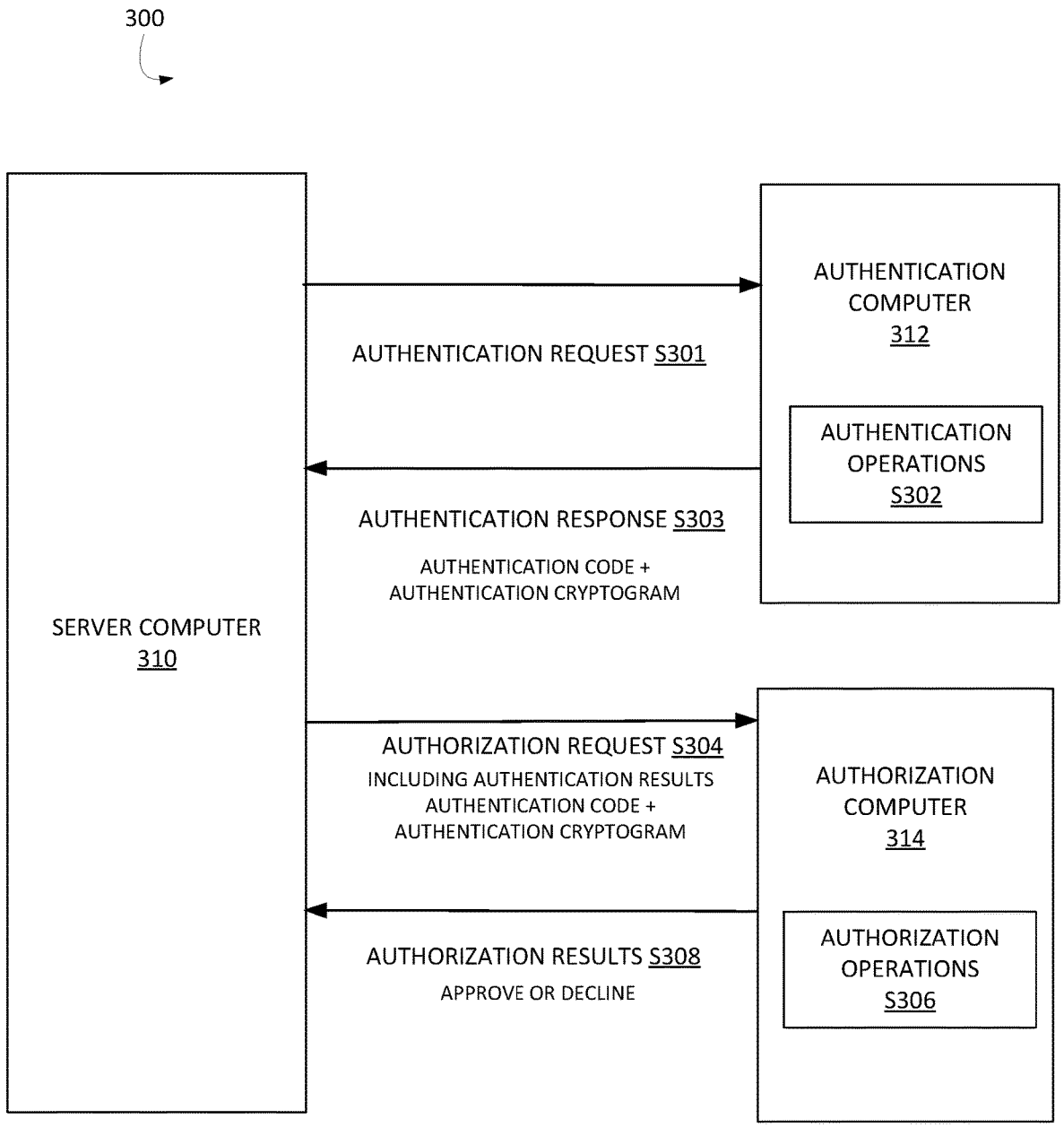
FIG. 3 shows an example set of operations for authentication and authorization using authentication codes and authentication cryptograms, in accordance with some embodiments.

FIG. 3 shows an example set of operations 300 for pre-authorization access request screening using authentication codes and authentication cryptograms. The operations may be initiated by a user requesting access to a resource via a user computing device and/or access device. The operations may be performed by a server computer 310 (which may be substantially similar to the server computer 104 of FIGS. 1-2), an authentication computer 312 (which may be substantially similar to the authentication computer 116 of FIGS. 1 and 3), and an authorization computer 314 (which may be substantially similar to the authorization computer 110 of FIG. 1).

At step S301, the server computer 310 transmits an authentication request message to the authentication computer 312. The authentication request message may include access data received from the user or a user device.

At step S302, the authentication computer 312 executes authentication operations. The authentication computer 312 may execute operations for verifying the user, based on the access data received in the authentication request message. The authentication computer may analyze the access data.

The authentication operations my include determining a risk level associated with the user and/or the access request.

Based on the risk level, the authentication computer 116 may determine whether the user should be authenticated.

The authentication operations may include step-up authentication. For step-up authentication, the authentication computer 312 may, directly or via the server computer 310, request additional data from the user. For example, the authentication computer 312 may transmit a message to a user computing device (e.g., user computing device 102 of FIG. 1) causing the user computing device to present a modal to the user for entering a password. The authentication computer 312 may then receive the password to use to authenticate the user. As another example, the authentication computer may transmit a step-up request to the server computer 310. The server computer 310 may then forward the step-up request to the access device (e.g., access device 108 of FIG. 1), causing the access device to prompt the user for a personal identification number (PIN). Alternatively, the authentication computer 312 may execute risk-based authentication operations without challenging the user for additional information.

The authentication computer 312 may arrive at an authentication result (e.g., whether or not the user has been authenticated). The authentication computer 312 may generate authentication data, which may include and/or support the authentication result, to transmit back to the server computer in an authentication response.

The authentication data generated by the authentication computer 312 may include an authentication code. As described above with respect to FIG. 1, the authentication code may be an alphanumeric code indicating the authentication results. As a non-limiting example, if the access request comprises a request for payment, then the authentication code may be an ECI code.

The authentication data generated by the authentication computer 312 may further include an authentication cryptogram. As described above with respect to FIG. 1, the authentication cryptogram may be a cryptogram such as a CAVV or AAV. The authentication cryptogram may be a unique identifier of the access request. The authentication cryptogram may indicate that this particular access request has been authenticated.

The authentication computer 312 may prepare an authentication response message comprising the authentication code and the authentication cryptogram. The authentication computer 312 may, for example, generate an extensible markup language (XML) message for transmission to the server computer.

At step S303, the authentication computer 312 transmits the authentication response message to the server computer 310. As shown, the authentication response message includes the authentication code (e.g., ECI) and the authentication cryptogram (e.g., CAVV). In other examples, only one may be sent.

The server computer 310 may process the information received in the authentication response message to determine whether to proceed with authorization. If the server computer 310 determines that it is appropriate to proceed with authorization, then the operations continue at step S304.

At step S304, the server computer 310 transmits an authorization request to the authorization computer 314. The authorization request may include the authentication results, which may include an authentication code and/or authentication cryptogram (e.g., an ECI and/or a CAVV).

At step S306, authorization computer 314 executes operations for risk evaluation. The authorization computer 314 may base the risk evaluation on information received in the authorization request message. As an example, the authorization computer 314 may use an ECI code value in determining whether to approve or decline the request for access to the resource.

At step S308, the authorization computer 314 transmits authorization results to the server computer 310. The authorization computer 314 may transmit the authorization results in an authorization response message. The authorization results may include instructions to approve or decline the access request.

B. Correlating Authentication Codes with Risk

Figure 4:
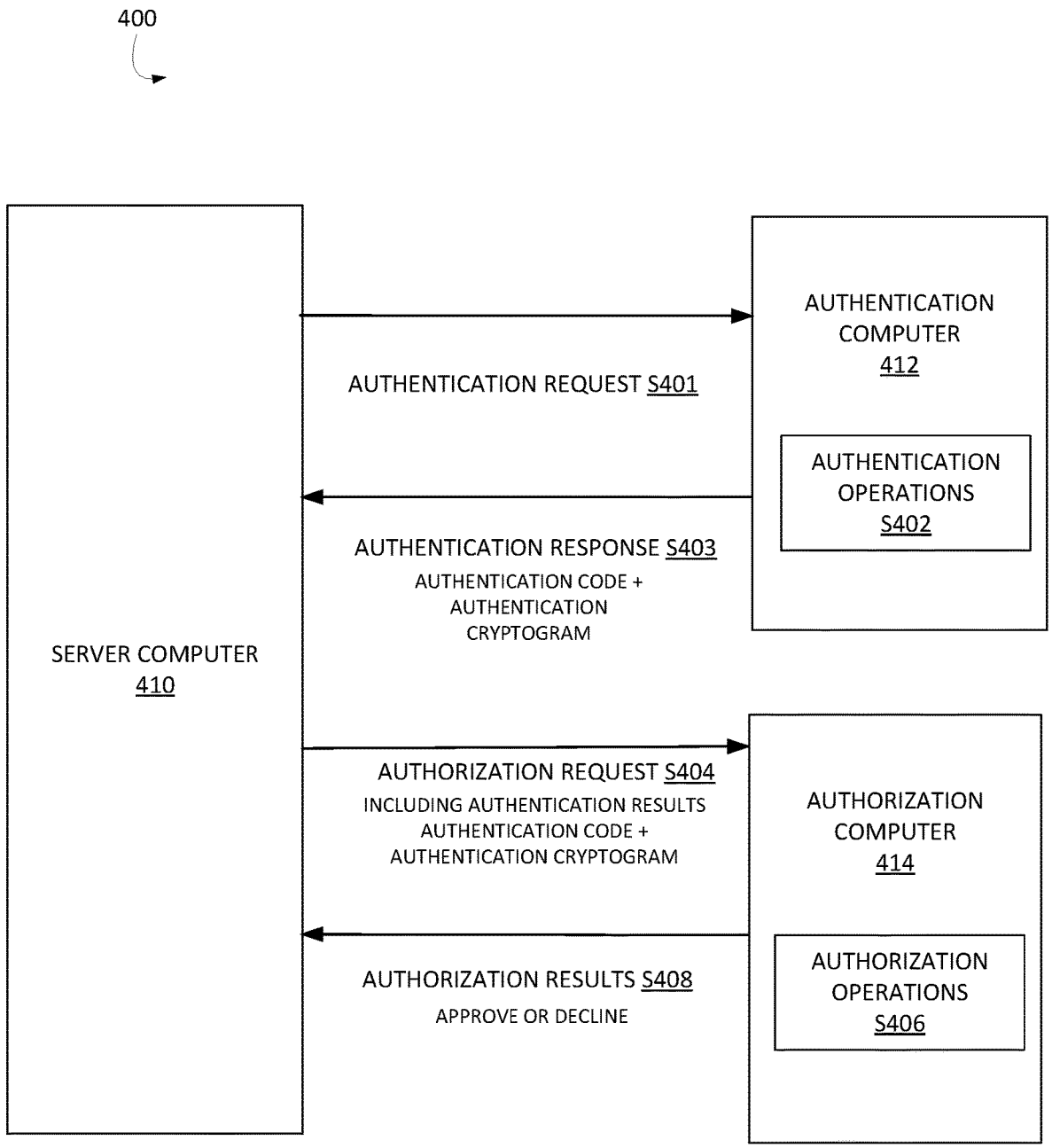
FIG. 4 shows an example set of operations for authentication and authorization wherein authentication codes are correlated with risk, in accordance with some embodiments.

FIG. 4 shows an example set of operations 400 for pre-authorization access request screening wherein authentication codes are correlated with risk. The operations may be performed by a server computer 410 (which may be substantially similar to the server computer 104 of FIGS. 1-2A), an authentication computer 412 (which may be substantially similar to the authentication computer 116 of FIGS. 1 and 2B), and an authorization computer 414 (which may be substantially similar to the authorization computer 110 of FIG. 1).

At step S401, the server computer 410 transmits an authentication request message to the authentication computer 412, e.g., as described above with respect to FIG. 4.

At step S402, the authentication computer 412 may execute authentication operations. The authentication operations may be executed substantially as described above with respect to FIG. 4. Additionally, the authentication computer 412 may reassign the authentication code to correspond to a determined risk level. For example, authentication computer 412 may set the authentication code to 5 for low-risk transactions and set the authentication code to 1 for high-risk transactions. The authentication computer may generate a mapping between existing authentication codes and risk. Hence, in some embodiments, the authentication computer may determine a level of authentication. The authentication computer may provide the mapping to the authorization computer.

At step S403, the authentication computer 412 transmits an authentication response message comprising authentication data to the server computer 410. Transmitting the authentication response message may be performed substantially as described above with respect to FIG. 4. Additionally, the authentication response message may include the authentication code assigned based on risk level.

At step S404, the server computer 410 transmits an authorization request to the authorization computer 414, as described above with respect to FIG. 4. Additionally, the authorization response message may include the authentication code assigned based on risk level.

At step S406, the authorization computer 414 executes operations for determining whether to authorize the access request. The authorization operations may include the authorization computer's own risk evaluation. The risk evaluation may include use of the received authentication code corresponding to a risk level. This may reduce the amount of risk analysis done on the part of the authorization computer 414.

At step S408, the authorization computer 414 transmits authorization results to the server computer 410. The authorization results may include instructions to approve or decline the access request.

C. Leveraging a Data Field to Pass Supplemental Data

In addition to, or instead of, the authentication code and/or authentication cryptogram, the system may pass more detailed data to the authorization computer (e.g., supplemental data, as described above with respect to FIG. 2B). The supplemental data may be passed in a specialized data field of the authorization request message, as detailed below.

Figure 5:
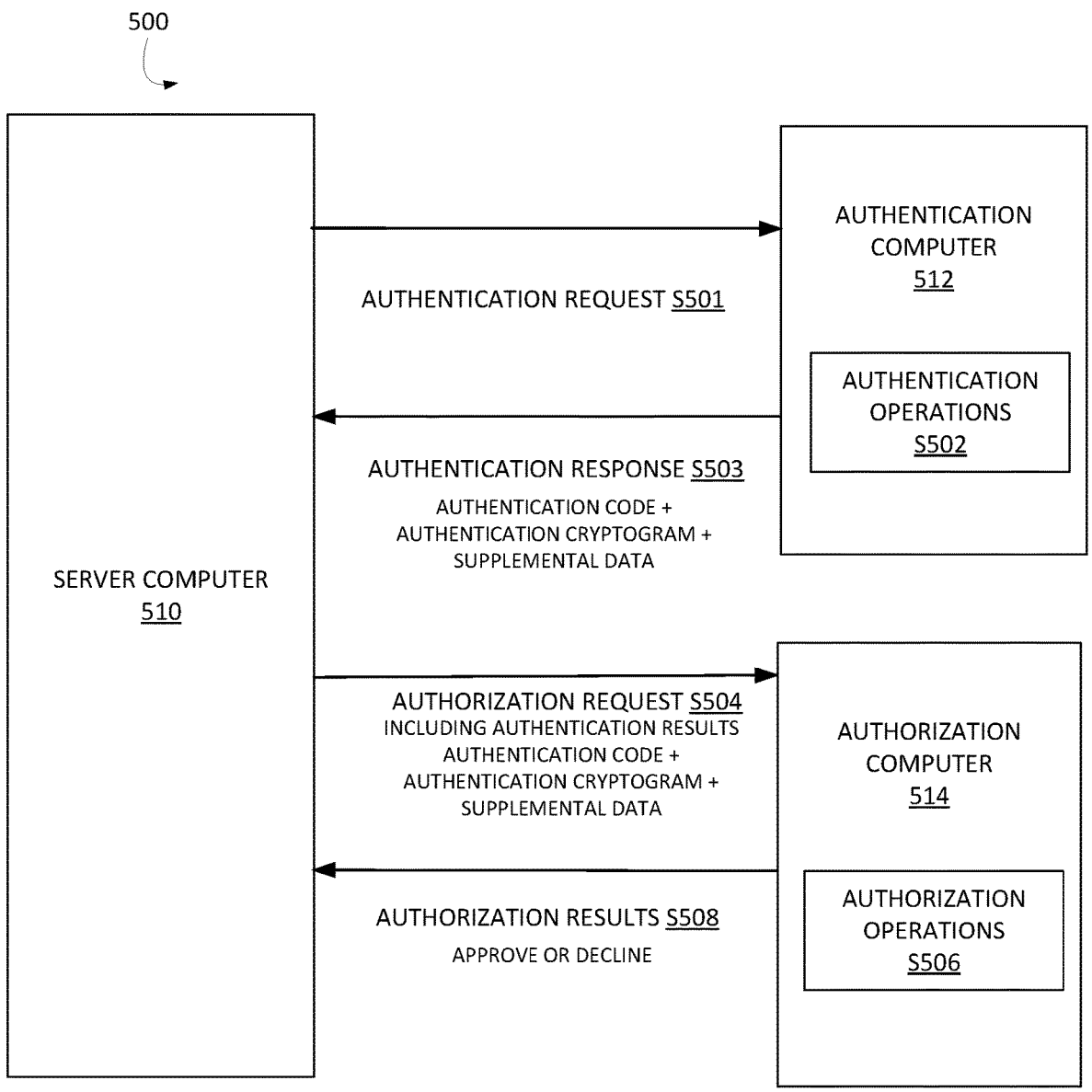
FIG. 5 shows an example set of operations for authentication and authorization leveraging a data field to pass supplemental data, in accordance with some embodiments.

FIG. 5 shows an example set of operations 500 for pre-authorization access request screening with supplemental data passed in a particular field of the authorization request message. The operations may be performed by a server computer 510 (which may be substantially similar to the server computer 104 of FIGS. 1-2), an authentication computer 512 (which may be substantially similar to the authentication computer 116 of FIGS. 1 and 3), and an authorization computer 514 (which may be substantially similar to the authorization computer 110 of FIG. 1).

At step S501, the server computer 510 transmits an authentication request message to the authentication computer 512, as described above with respect to FIG. 4.

At step S502, the authentication computer 512 may execute authentication operations. The authentication computer 512 may execute the authentication operations substantially as described above with respect to FIGS. 4 and/or 5. The authentication computer 512 may further generate supplemental data. As described above with respect to FIG. 1, supplemental data may include various types of data generated and/or processed by the authentication computer such as risk-based authentication data, biometric data, customer data, device data, order data, etc.

At step S503, the authentication computer 512 transmits an authentication response message, comprising authentication data, to the server computer 510. Transmitting the authentication response message may be performed substantially as described above with respect to FIG. 2B. Additionally, the authentication response message includes the supplemental data (e.g., detailed information generated in the course of authentication, biometric data, etc.). The supplemental data may be provided alongside other authentication data such as an authentication cryptogram and/or authentication code.

At step S504, the server computer 510 transmits an authorization request message to the authorization computer 514, as described above with respect to FIG. 4. The supplemental data may be passed seamlessly in a data field. Authorization request messages may be formatted according to various standards (e.g., International Standard Organization (ISO) 8583 and 20022 are commonly used for financial messaging; some service providers use their own formats). These formats may assign data fields to discrete data elements (e.g., for a given standard, transaction ID may be in field 1, amount may be in field 10, etc.). Some fields are fixed length (e.g., a fixed character length). Some fields have variable length (e.g., up to a certain number of bits). Some fields may be "open data fields," which are not linked to a particular data set or size. For example, depending on the processing system, fields such as field 34 and 48 may be left open. By leveraging an open data field of the authorization request message such as field 34, the authorization request message may be overloaded with new types of information.

At step S506, the authorization computer 514 executes operations for determining whether to approve or decline the access request. The authorization computer 514 may make the determination substantially as described above with respect to FIGS. 3 and/or 4. Additionally, the evaluation may include leveraging the supplemental data received in the data field of the authorization request. For example, the authorization computer 514 may receive supplemental data indicating that the authentication computer 512 has validated biometric data of the user. The authorization computer may rank biometric validation more highly than other types of validation performed by the authentication computer (e.g., password data). Accordingly, the authorization computer 514 may approve an access request based in whole or in part on receiving an indication of biometric validation.

At step S508, the authorization computer 110 transmits the authorization results to the server computer 104. The authorization results specify whether the access request is approved or declined.

III. ADDING AN ACCESS INDICATOR TO A DATA FIELD

Figure 6:
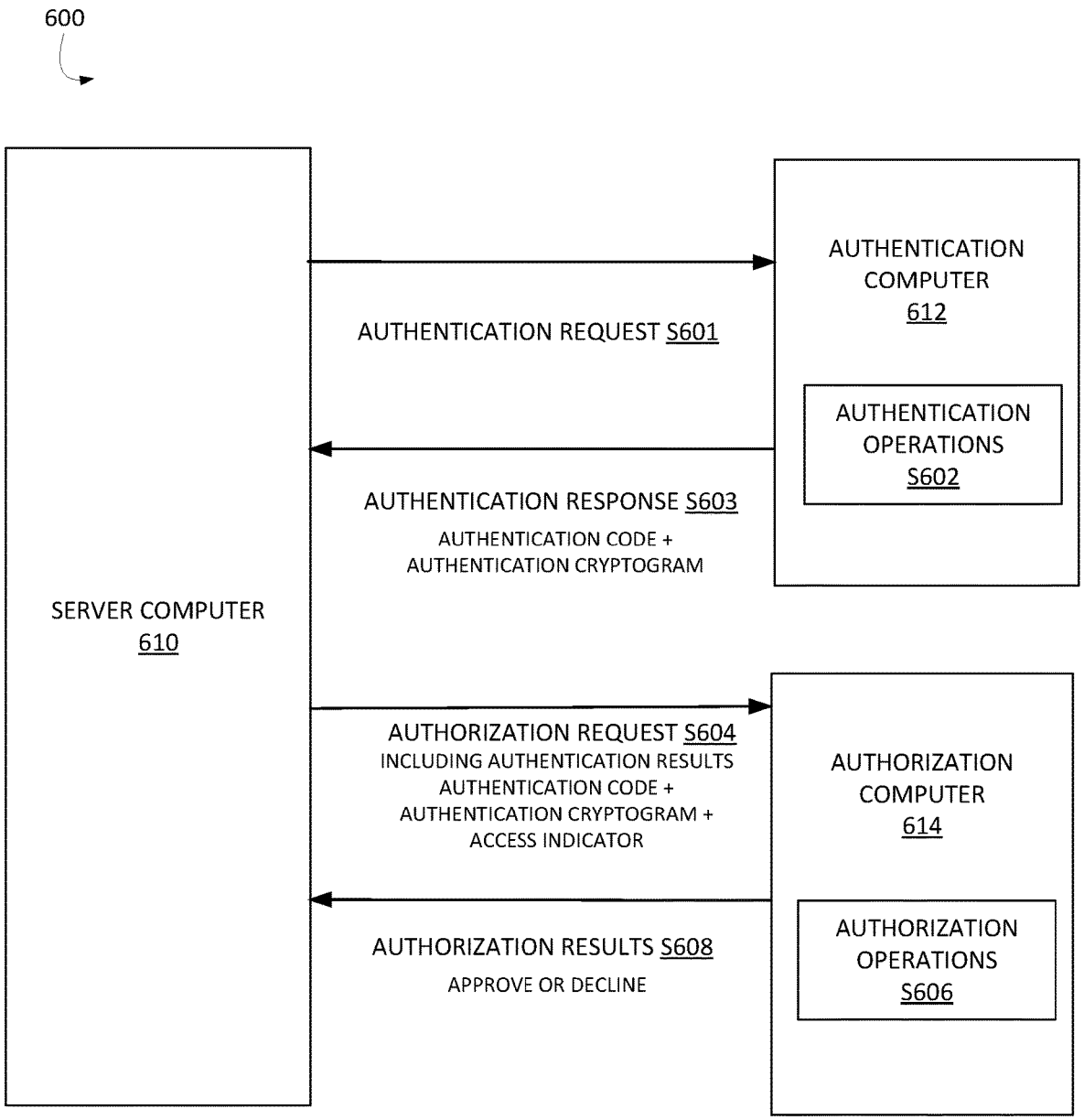
FIG. 6 shows an example set of operations for authentication and authorization using an access indicator, in accordance with some embodiments.
Figure 7:
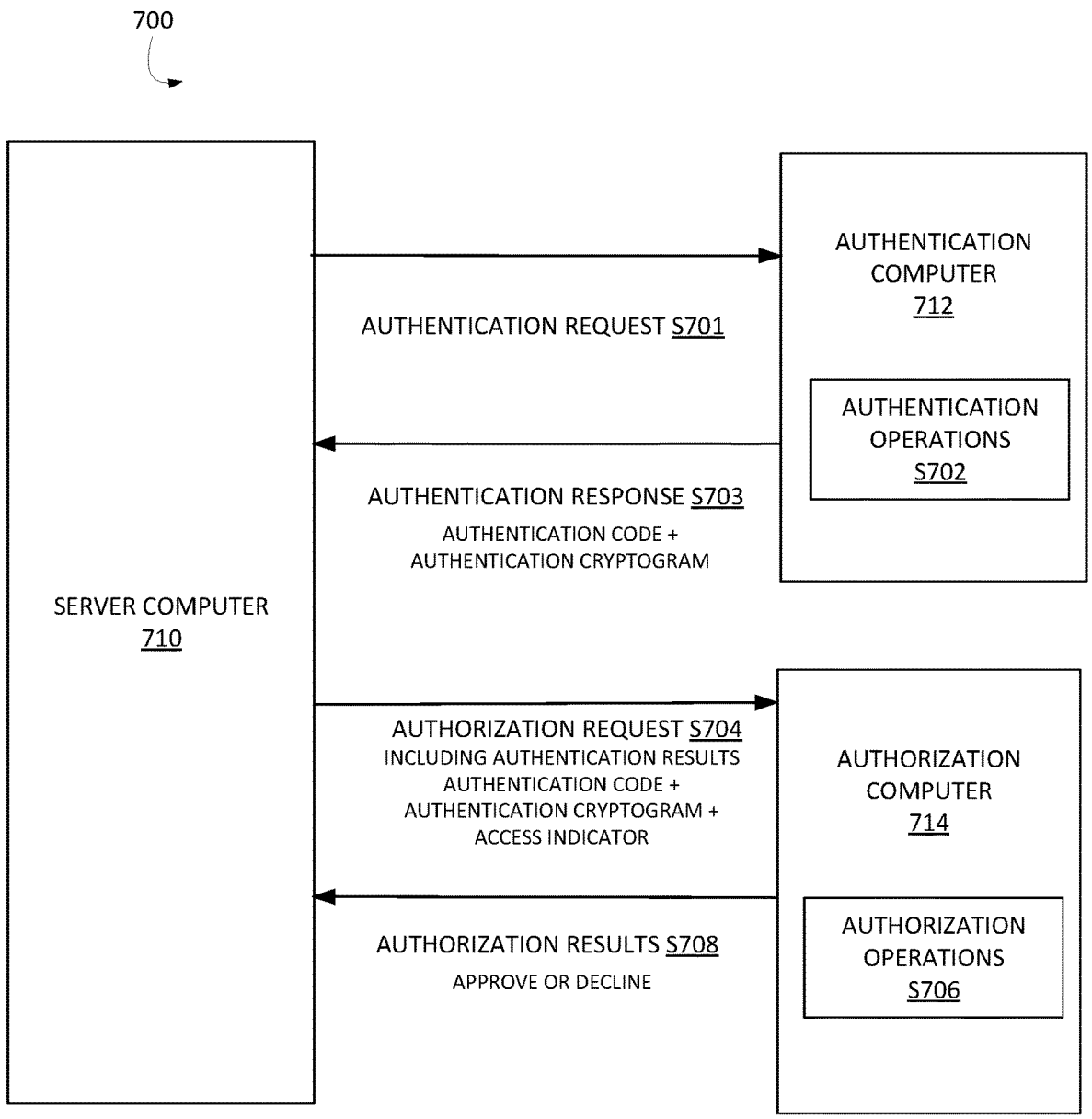
FIG. 7 shows an example set of operations for authentication and authorization using an access indicator which provides a guarantee, in accordance with some embodiments.

FIGS. 6-7 illustrate additional variations on methods for pre-authorization access request screening. Similarly to the methods described above with respect to FIGS. 3-5, authentication data generated by an authentication computer is used to transmit information to an authorization computer. As illustrated in FIGS. 6-7, the system may use data generated in a fraud check to generate an access indicator which provides a simple indication whether the access request should be approved or declined.

A. Access Indicator

FIG. 6 shows an example set of operations 600 for pre-authorization access request screening leveraging a data field to pass an access indicator. The operations may be performed by a server computer 610 (which may be substantially similar to the server computer 104 of FIGS. 1-2A), an authentication computer 612 (which may be substantially similar to the authentication computer 116 of FIGS. 1 and 2B), and an authorization computer 614 (which may be substantially similar to the authorization computer 110 of FIG. 1).

At step S601, the server computer 610 transmits an authentication request message to the authentication computer 612, as described above with respect to FIG. 4.

At step S602, the authentication computer 612 may execute authentication operations. The authentication computer may execute authentication operations substantially as described above with respect to FIGS. 3, 4, and/or 5.

At step S603, the authentication computer 116 transmits an authentication response message comprising authentication data to the server computer 610. Transmitting authentication the authentication response message may be performed substantially as described above with respect to FIGS. 3, 4, and/or 5.

The server computer 610 may evaluate the likelihood that the access request is fraudulent. The server computer 610 may leverage an access rule generation system (similar to access rule generation system 106 of FIG. 1) to retrieve and/or generate access rules to use to evaluate the access request. The server computer 610 may further use access data to evaluate the access request. Alternatively, or additionally, the server computer 610 may evaluate the access request based on the authentication data. The server computer 610 may generate an access score indicative of a level of risk associated with the access request.

Based on the access score, the server computer 610 may generate an access indicator. The access indicator may indicate that the server computer has approved the access request. The access indicator may be an alphanumeric value. As an example, the access indicator may be the letter "A", inserted into the authorization request message to indicate that the server computer 610 has approved the access request. Alternatively, or additionally, the server computer 610 may use different access indicators to further define the results of the fraud screening. As an example, the server computer may generate an "A" access indicator for approved access requests and generate a "R" access indicator for access requests which have been screened but require additional review by the server computer 610. The server computer 610 may refrain from generating an access indicator for access requests which have not been assigned a suitably high access score. The access indicator may represent the result of the server computer's use of access rules generated by the access rule generation system.

In some embodiments, the server computer 610 may be able to accurately evaluate the risk level of an access request using data elements which are unavailable to the authorization computer 614. Data elements which may be available to the server computer 610 but not the authorization computer 614 may include: contextual data (e.g., a device fingerprint, IP address, etc.), access device data (e.g., positive lists, Stock Keeping Unit (SKU) level information, etc.), and/or calculated data (e.g., risk scores, velocities, linkages, etc.). These data elements may be leveraged to provide a useful access indicator to the authorization computer 614.

At step S604, the server computer 610 transmits an authorization request message to the authorization computer 614, as described with respect to FIGS. 3-5. Additionally, the server computer 610 includes the access indicator in the outbound authorization request message. The server computer 610 may add the access indicator to the authorization request message (e.g., in field 34 or another suitable data field of the authorization request message).

In some embodiments, the authorization request message may further include any of the additional authentication data described above with respect to FIGS. 3-5, such as authentication codes, authentication cryptograms, supplemental data, etc. Alternatively, the server computer 610 may simply include the access indicator, without additional risk data, to simplify the analysis required by the authorization computer 614.

At step S606, upon receiving the authorization request message, the authorization computer 614 executes authorization operations as described above with respect to FIGS. 3-5. Alternatively, or additionally, the authorization computer 614 may base the authorization decision, in whole or in part, upon the received access indicator. The authorization computer 614 may simply approve or deny the access request based on the access indicator. The authorization computer 614 may determine the extent to which it relies on the access indicator in generating an authorization result.

At step S608, the authorization computer 614 transmits authorization results to the server computer 610. The authorization results may include instructions to approve or decline the access request.

B. Providing Guarantee for Access Requests

FIG. 7 shows an example set of operations 700 for pre-authorization access request screening including a guarantee for authenticated access requests. The operations may be performed by a server computer 710 (which may be substantially similar to the server computer 104 of FIGS. 1-2A), an authentication computer 712 (which may be substantially similar to the authentication computer 116 of FIGS. 1 and 2B), and an authorization computer 714 (which may be substantially similar to the authorization computer 110 of FIG. 1).

Operations 701-704 may be performed substantially as described above with respect to Operations 602-604 of FIG. 6. Additionally, the system may generate the access indicator to represent a guarantee. An access indicator representative of a guarantee may take a different form than an access indicator representative of screening results as described above with respect to FIG. 6. For example, the server computer 710 may assign an access indicator of "A" for authorized access requests and an access indicator of "G" for guaranteed access requests. As another example, the server computer 710 may use two access indicators for guaranteed transactions (e.g., A and G flags may both be inserted into the authorization request message for guaranteed access requests).

The server computer 710 may build a guarantee model around the access indicator. The access indicator may represent that, if the access indicator is present in the authorization request message, then an entity associated with the server computer (e.g., a security company or merchant) is guaranteeing this access request. Thus, the access indicator may represent a shift in liability should the access request be fraudulent. The access indicator representing a guarantee may be used in connection with a pre-existing agreement between the server computer 710, authentication computer 712, and/or authorization computer 714.

IV. METHODS FOR PRE-AUTHORIZATION ACCESS REQUEST SCREENING

FIGS. 10-13 illustrate various methods of performing a pre-authorization access request screening and passing the results thereof to an authorization computer for determining whether to grant access to a resource.

A. Using an Access Indicator

Figure 8:
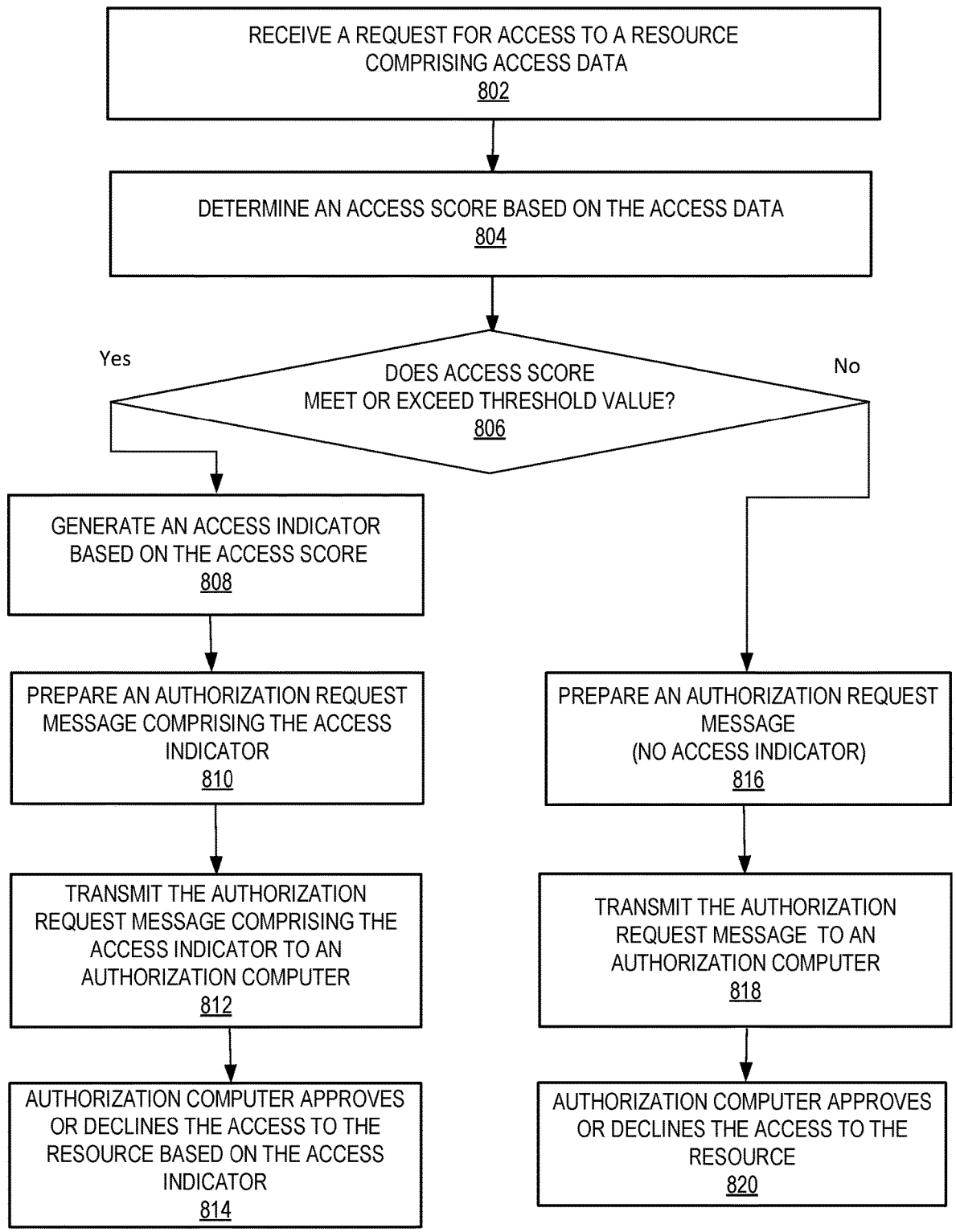
FIG. 8 shows an example set of operations for pre-authorization access request screening using an access indicator, in accordance with some embodiments.

A method for pre-authorization access request screening is described with respect to FIG. 8. As described above with respect to FIGS. 3-7, the server computer may transmit an authorization request message comprising an access indicator and/or authentication data to the authorization computer for determining whether to approve or decline a request for access to a resource. The flowchart of FIG. 8 illustrates operations for generating and processing such a message. The operations shown in FIG. 8 may be performed by the server computer 104 and authorization computer 110 shown in FIGS. 1 and 2A.

Before step 802, a user may request access to a resource to a user device. For example, a user may attempt to enter a building by tagging a card (user device) to an access device. As another example, a user may attempt to purchase clothing online by entering payment information into a resource provider website via a user computing device such as a mobile phone. In either case, the user may submit access data (e.g., employee identification data, payment data, the user's name, etc.) to the access device or user computing device. The access device and/or user computing device then transmits a request for access to the resource, comprising the access data, to the server computer.

At step 802, the server computer receives, from a requesting device, the request for access to the resource to the user device. The requesting device may be the user computing device or the access device. The request comprises access data. request may be received, for example, via a message and/or a push to an API exposed by the server computer.

After step 802, the server computer may transmit and receive authentication request messages, as described below with respect to FIG. 9. Alternatively, the server computer may proceed to step 804 without transmitting and receiving authentication request messages. FIGS. 10-13 illustrate scenarios in which authentication may or may not be executed based on the application of exemptions.

At step 804, the server computer determines an access score based on the access data. The server computer may use access rules retrieved from the access rule generation system to determine the access score. The access rule generation system may determine the access rules based on historical data about previous access attempts, statistical models, and/or machine learning algorithms. The server computer may fine-tune the modeling to tailor the access rules. The server computer may further use on access data and/or authentication data for determining the access score.

The server computer may apply the selected access rule(s) to the access data, resource access parameters, and/or authentication data. As an example, the rule is "IF Country=Brazil AND Amount>$10,000 THEN Decline ELSE Approve." If the country is Brazil and the amount is $9,000, then the rule would result in Approve. If the country is Brazil and the amount is $11,000, then the rule would result in Decline. If the amount is $16,000 and the country is Sweden, then the rule would result in Approve.

The server computer may generate an access score based on a comparison of the rule values and the access data values. Continuing with the above example where the rule specifies a country and a dollar amount, the higher the dollar amount, the higher the access score may be. A $20,000 transaction in Brazil may have an access score of 4, while a $10,001 transaction in Brazil may have an access score of 3. The access score may be incremented if both the country and dollar amount are caught by the rule, as compared to if only one factor is caught by the rule (e.g. $10,001 in Brazil has an access score of 3 and $9,500 in Brazil has an access score of 2).

At step 806, the server computer compares the access score to a threshold value. The threshold value may represent an access score which should correspond to an authorized access request. Alternatively, or additionally, the server computer may use multiple thresholds corresponding to multiple respective results. For example, if the access score is 95 or greater, the server computer guarantees the transaction; if the access score is between 85 and 95, the server computer authorizes the access request; if the access score is between 75 and 95, the server computer flags the access request for manual review.

At step 808, the server computer generates an access indicator based on the access score. The server computer may generate the access indicator upon determining that the access score meets or exceeds the threshold value. As described above with respect to FIGS. 6-7, the access indicator may take different forms to fine-tune the information passed to the authorization computer. The different forms may, for example, correspond to one of several threshold values. Alternatively, the server computer may use a single flag corresponding to a single threshold value.

The server computer may generate the access indicator by comparing the access score to a threshold value. As an example, the server computer may determine that the access request passes the access screening if the access score meets or exceeds the threshold value. As a specific example, the server computer computes an access score of 80 for a particular access request. The server computer identifies a stored threshold value of 78 for passing the access screening. Based on comparing the access score to the threshold value, the server computer determines that the access request has passed the screening and should be approved. On the other hand, if the value is less than the threshold value (e.g., 77 or less), then the server computer may determine that the access request does not pass the access screening.

Alternatively, or additionally, the server computer may generate the access indicator by comparing the access score to multiple threshold values. As an example, the server computer may use a first threshold value (e.g., 78 for determining that an access request should be approved). The server computer may further use a second threshold value (e.g., 49) for determining that access to the resource should be declined. The second threshold value may correspond to a second flag, warning message, or the like. For access requests that exceed the second threshold value but do not meet exceed the first threshold value (e.g., 50-77), the server computer may refrain from generating an access indicator. As another example, the server computer may use a first threshold value for access requests highly likely to be valid (e.g., access score >95) and a second threshold value for access requests with a satisfactory likelihood of being valid (e.g., access score >75).

Based on whether the access request passes the access screening, the server computer may, or may not, generate an access indicator representing that access to the resource should be granted. Thus, the access indicator can be used as an assurance that the access request has passed the server computer's access screening process. This may indicate that the server computer has determined that the access request is not likely to be fraudulent.

In some embodiments, the access indicator may represent a guarantee. The access indicator may indicate that the entity managing the server computer (e.g., a merchant, a security company, etc. that facilitates access to the resource) guarantees the access request. Alternatively, or additionally, the guarantee may be made on the part of a third-party service provider performing fraud checks on behalf of the server computer. If the access request were to turn out to be fraudulent, the entity managing the service provider or the service provider performing fraud checks will accept any liability associated with the unauthorized access.

At step 810, the server computer prepares an authorization request message including the access indicator. The server computer may place the access indicator in a particular field of the authorization request message (e.g., field 34). Alternatively, or additionally, the server computer may include the access score in the authorization request message. The server computer transmits the authorization response message to the authorization computer.

At step 812, the server computer transmits the authorization request message, comprising the access indicator, to an authorization computer. The server computer may, for example, transmit an XML message to the authorization computer and/or push the message to an API exposed by the authorization computer.

At step 814, the authorization computer approves or declines the access to the resource to the user device based on the access indicator. In some embodiments, the authorization computer may trust the access indicator/server computer enough to simply approve or decline the access request based solely on the access indicator (e.g., if there is an access indicator in the message, the access request will be approved, but if there is no access indicator in the message, then the access request will be declined). The authorization computer may be particularly confident in relying on the access indicator if the access indicator indicates a guarantee on the part of the server computer. Alternatively, the authorization computer may use the access indicator as a supplement to the authorization computer's access determination process. For example, the authorization computer approves or declines the access request based on a computed score from one to one hundred, and the presence of an access indicator gives the score a ten-point increase.

If the server computer determines at step 806 that the access score does not meet or exceed the threshold value, then the server computer may refrain from generating an access indicator.

At step 816, the server computer may prepare an authorization request message without including an access indicator. The server computer may prepare a standard authorization request message in the event that the access score does not meet or exceed the threshold value. Alternatively, or additionally, the server computer may include information indicating that the access request should be declined.

At step 818, the server computer may transmit the authorization request message to the authorization computer. The server computer may, for example, transmit an XML message to the authorization computer and/or push the message to an API exposed by the authorization computer.

At step 820, the authorization computer may approve or decline the access to the resource. The authorization computer may execute its own risk checks to approve or decline the access to the resource, without the use of an access indicator. The authorization computer may use other information received from the server computer to inform its decision (e.g., access score, authentication data, etc.). The authorization computer may be more likely to decline access to the resource if there is not an access indicator present in the authorization request. The authorization computer may, for example, determine that authorization requests without an access indicator should always be declined. Alternatively, the authorization computer may determine that authorization requests without an access indicator should be subjected to increased scrutiny.

B. Using Authentication Data

Figure 9:
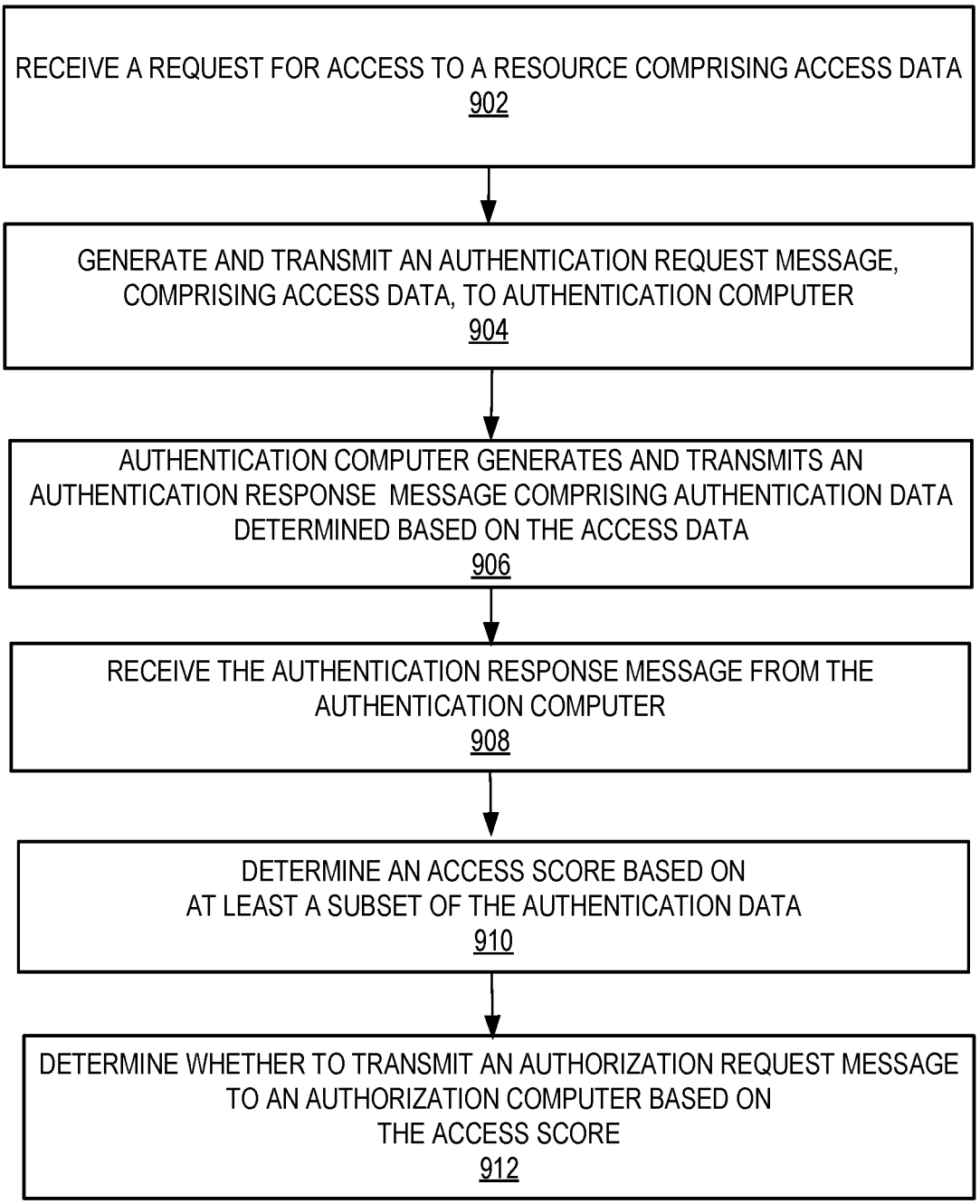
FIG. 9 shows an example set of operations for pre-authorization access request screening using authorization data, in accordance with some embodiments.

A method for pre-authorization access request screening using authentication data is described with respect to FIG. 9. The operations shown in FIG. 9 may be performed by the server computer 104, authentication computer 116, and authorization computer 110 shown in FIGS. 1-2B.

At step 902, the server computer receives a request from a requesting device for access to a resource to a user device comprising access data. Step 902 may be substantially similar to step 802, described above with respect to FIG. 8.

At step 904, the server computer generates an authentication request message. The server computer may generate the authentication request message using a suitable format acceptable by the authentication computer. The authentication request message may include information such as the received access data, in whole or in part, and/or the access data, in whole or in part. The access request may further include an access request indicator (e.g., a series of numbers and/or letters identifying the access request). The server computer transmits the authentication request message to the authentication computer.

At step 906, the authentication computer generates an authentication response message comprising authentication data corresponding to authentication of the user device. The authentication computer may determine whether to authenticate the user based on information extracted from the authentication request message (e.g., the access data). The authentication computer may generate authentication data comprising an authentication code such as an ECI code. The authentication data may further include an authentication cryptogram such as a CAVV. Further details about such codes and values are described above, e.g., with respect to FIGS. 1 and 3.

In some embodiments, the authentication computer may execute risk-based authentication. The authentication data generated by the authentication computer may include supplemental data associated with risk-based authentication. The authentication computer may transmit through an authentication code or authentication cryptogram (e.g., by assigning the ECI based on a determined risk level).

The authentication computer transmits the authentication response message, comprising the authentication data, to the server computer. The authentication computer may, for example, transmit the authentication response message via wired or wireless communication and/or a push to an API.

At step 908, the server computer receives the authentication response message comprising the authentication data from the authentication computer. The server computer may, for example, receive the response via a messaging bus or a push to an API exposed by the server computer At step 910, the server computer determines an access score based on at least a subset of the authentication data and the access data. Methods of determining an access score based on access data are described in detail above with respect to FIG. 8. The server computer may further use authentication data to determine the access score. For example, the access rules may take authentication data into account, such as the results of risk-based authentication, whether the user has been authenticated, etc. As a specific example, the server computer may receive, from the authentication computer, authentication data comprising historical access data associated with the user. The server computer may increment or decrement the access score based on a comparison of the historical transaction data and the access data corresponding to the present access request.

At step 912, the server computer determines whether to transmit an authorization request message to an authorization computer based on the access score. The server computer may compare the access score to one or more threshold values in determining whether or not to transmit the authorization request message to the authorization computer. For example, if the access score is below a first threshold value, the server computer may refrain from transmitting the authorization request message, as the access to the resource should not be granted. If the access score is above the first threshold value, then the server computer may transmit an authorization request message comprising an access indicator or other information, as described above with respect to FIGS. 3-8. If the access score is above a second threshold value, then the server computer may further provide a guarantee for the access request.

After step 912, the server computer may prepare an authorization request message. The authorization request message may include the access score and/or associated data, such as an access indicator, ECI, and/or the like, as described in detail above with respect to FIGS. 3-8.

The authorization computer may approves or declines the access to the resource, directly or indirectly based on the access score, as described in detail above with respect to FIGS. 3-8.

C. Applying an Exemption to Skip Authentication

Figure 10:
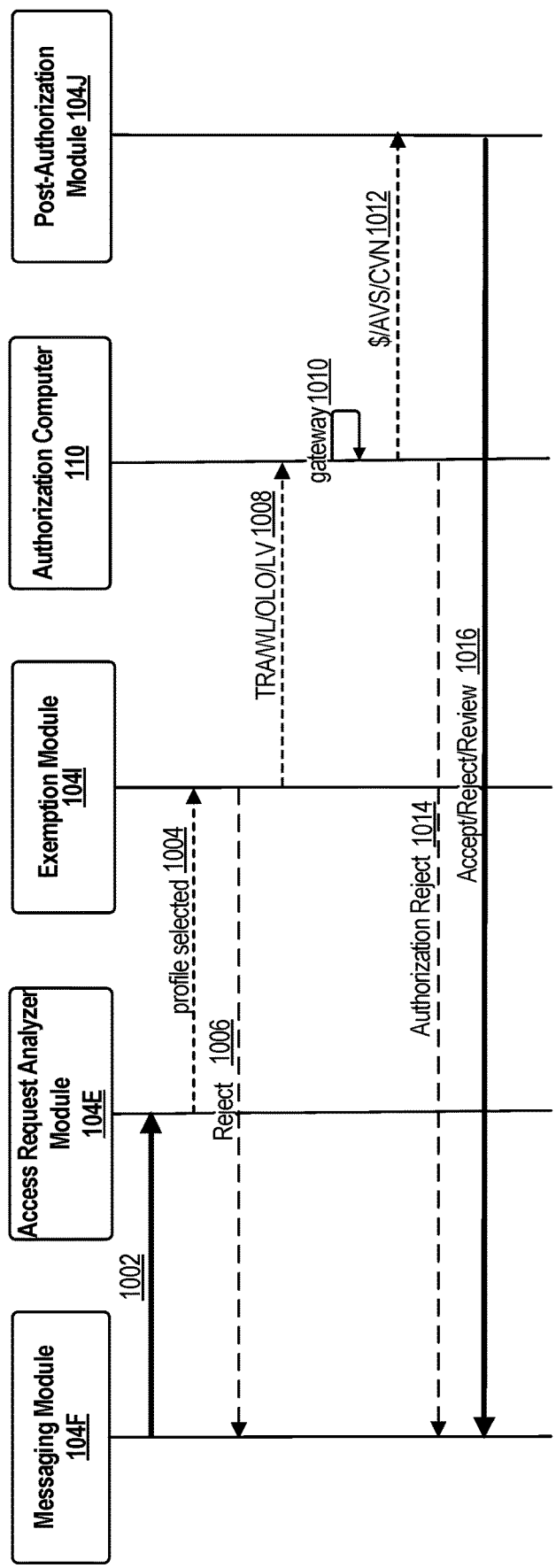
FIG. 10 shows an example set of operations for pre-authorization access request screening using an exemption, in accordance with some embodiments.

A method for pre-authorization access request screening using an authentication exemption is described with respect to FIG. 10. The operations shown in FIG. 10 may be performed by the server computer 104, authentication computer 116, and authorization computer 110 shown in FIGS. 1-2B.

At step 1002, the messaging module 104F makes a call to the access request analyzer module 104E. The messaging module 104F may transmit information such as access data to the access request analyzer module 104E.

The access request analyzer module 104E may select a profile for the access request. The access request analyzer module 104E may assign access requests to predefined profiles based on the access data. For example, purchases over $10,000 may correspond to a first profile, purchases under $100 may correspond to a second profile, and purchases between $100 and $10,000 may correspond to a third profile. As other examples, profiles may correspond to location, characteristics of the party requesting access to the resource, a time of day, and/or the like.

At step 1004, the access request analyzer module 104E may transmit information about the selected profile to the exemption module 104I. Alternatively, or additionally, the access request analyzer module 104E may transmit access data to the exemption module 104I. The exemption module 104I may make a determination whether an exemption applies, based on the selected profile and/or access data. As examples, exemptions may apply for access requests corresponding to a profile for trusted users or a profile for purchases under $100. As another example, an exemption may apply for access requests that correspond to Payment Service Directive 2 (PSD2) exemptions. PSD2 exemptions are exemptions to a requirement in the European Union that all payment transactions should go through a high level authentication process. PSD2 exemptions include Transaction Risk Analysis (TRA), wherein a number of chargebacks is below a certain level; whitelisting (WL), which applies when a trusted resource provider has been placed on a whitelist; One Leg Out (OLO), which applies when a party to the transaction is not located in the EU; or Low Value (LV), wherein the transaction amount is less than 30 Euro. The exemption module 104I may determine that one or more such exemptions apply, based on the profile and/or access data corresponding to the access request.

At step 1006, optionally, the system may reject the access request after the profile is selected. The access request may be rejected after the profile is selected, e.g., before authentication or authorization, based on access rules and received access data. For example, the system may reject the access request for individuals or countries on a blacklist. If the authorization request is rejected, then the system may refrain from continuing to process the request.

Figure 11:
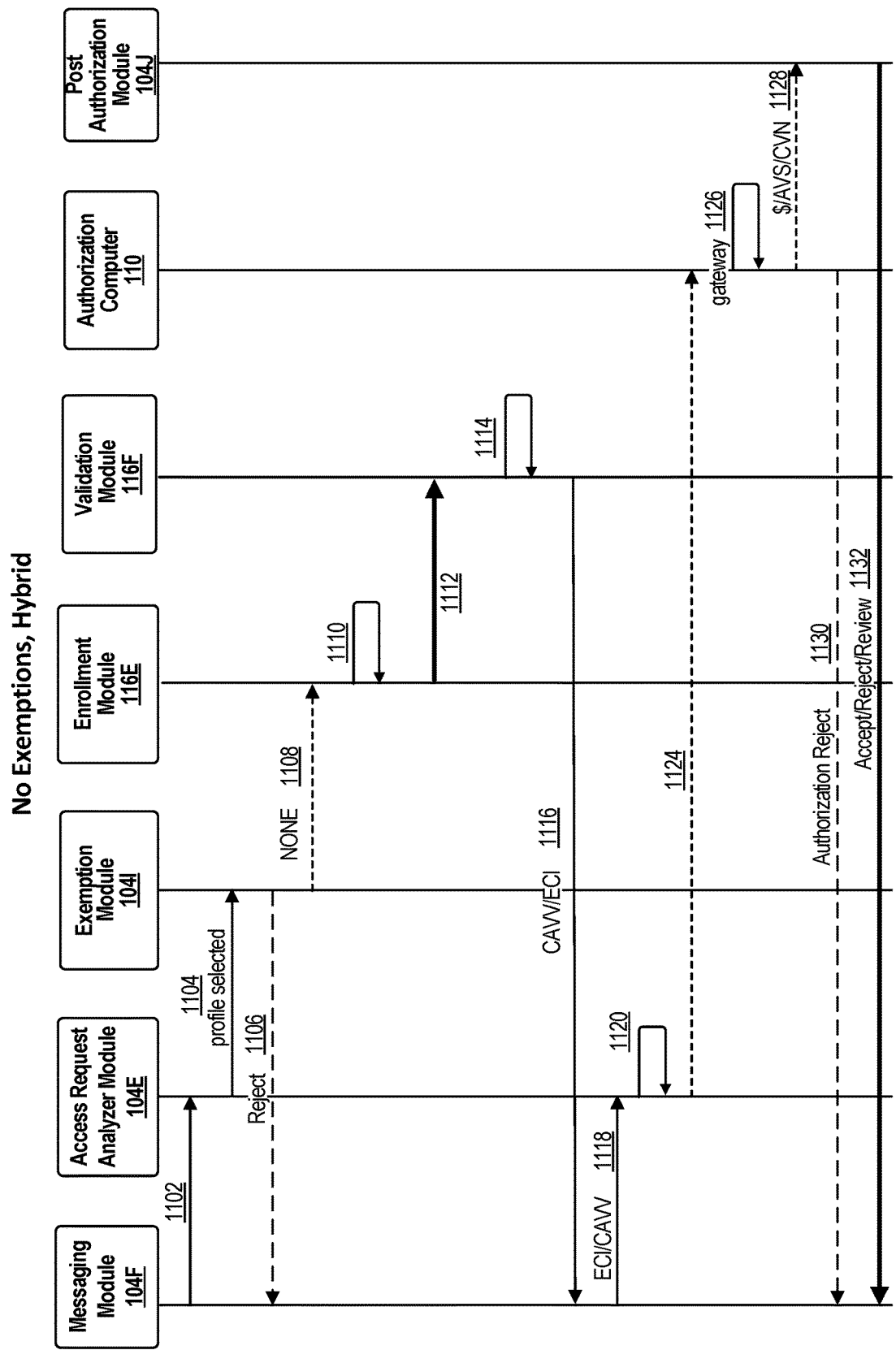
FIG. 11 shows an example set of operations for pre-authorization access request screening without an exemption, in accordance with some embodiments.

At step 1008, the system may transmit an authorization request message to the authorization computer 110. The authorization request message may be sent without the need for authentication operations, based on an applied exemption. The authorization request message may include information indicating the applied exemption (e.g., TRA/WL/OLO/LV, as indicated in FIG. 11).

At step 1010, the authorization computer 110 may execute authorization operations. The authorization computer 110 may execute authorization operations by leveraging the data received from the server computer 310. For example, the authorization computer may simply determine to authorize the access request based on receiving an access indicator, as described above with respect to FIG. 8. Alternatively, or additionally, the authorization computer 110 may determine whether to authorize the access request by analyzing the received data according to its own rule set.

If the authorization computer 110 determines not to authorize the access request, at step 1014, the authorization computer 110 may optionally notify the messaging module 104F that the access to the resource is rejected. The authorization computer may transmit the notification via an authorization response message.

At step 1012, the authorization computer 110 may transmit authorization results to the post-authorization module 104J. The authorization results may include an indication whether adequate funds are available in a payment account, in the case of payment transactions. The authorization results may include the results of an Address Verification Service (AVS) check. An AVS is check may be performed after analyzing some or all of an address submitted in an access request. The authorization computer 110 may compare the address data to that on file in association with an account in determining an authorization result. For example, a cardholder may be prompted to enter her zip code when purchasing gasoline. This zip code may be used by the authorization computer 110 in authorizing the transaction, by comparing the received zip code to the zip code stored in association with the payment account. The authorization results may include the results of a card verification number (CVN) check. A CVN is a three or four digit code associated with a payment account. The authorization computer may determine whether the CVN received in the authorization request message is a match to the value which the authorization computer has on file. As another example, authorization results may include a confirmation that a user has valid credentials to enter a secure location.

At step 1016, the post-authorization module 104J may analyze the information received from the authorization computer 110. The post-authorization module 104J may make its own determination about whether access to the resource should be granted. This determination may be based on the information received from the authorization computer 110 (e.g., AVS, CVN, or fund availability information). The determination may further be based on additional information available to the server computer (which the authorization computer 110 may not have had access to), such as access data, access rules, access scores, etc. Thus, the post-evaluation module may in some cases make a different determination than the authorization computer 110.

At step 1016, the post-authorization module may transmit a final result to the messaging module 104F. The result may be to allow (accept) access to the resource. The result may be to reject access to the resource. The result may be to further review the request.

After step 1016, the messaging module 104F may initiate appropriate action, based on information received from the authorization computer 110 and/or the post-authorization module 104J. If either entity has determined to decline the access request, the messaging module 104F may transmit instructions to the access device to reject access. If both entities have determined to approve, the messaging module 104F may transmit instructions to the access device to grant access. If the post-authorization module has determined that there should be a review, then the messaging module 104F may transmit instructions to the server computer to initiate a manual review process.

D. Hybrid Screening without Exemptions

A method for hybrid pre-authorization access request screening without exemptions is described with respect to FIG. 11. The operations shown in FIG. 11 may be performed by the server computer 104, authentication computer 116, and authorization computer 110 shown in FIGS. 1-2B.

At step 1102, the messaging module 104F makes a call to the access request analyzer module 104E, as described above with respect to step 1002 of FIG. 11. The access request analyzer module 104E may then select and transmit a profile to the exemption module 104I at step 1104, as described above with respect to step 1004 of FIG. 10.

At step 1106, optionally, the system may reject the authorization request after the profile is selected, as described above with respect to step 1006 of FIG. 10.

At step 1108, the exemption module may determine that no exemption applies. The exemption module may determine that no exemption applies by comparing the received profile and/or access data to exemption rules. Upon determining that no exemption applies, the exemption module may transmit an authentication request message to the authentication computer, which may explicitly or implicitly specify that no exemption applies.

At step 1110, the enrollment module 116E of the authentication computer may execute BIN detection operations. The enrollment module may identify a BIN from the data received in the authentication request message. Based on the BIN, the enrollment module may determine how to handle authentication. This may include determining an enrollment status of one or more entities involved (e.g., whether the user, issuer, or merchant is enrolled in a secure authentication protocol).

At step 1112, the enrollment module 116E may transmit instructions to the validation module 116F to execute authentication operations. The instructions may include a prescribed level of authentication (i.e., standard or heightened authentication measures may be called for based on exemptions, enrolment status, access data, and/or the like).

At step 1114, the validation module 116F may execute authentication operations. The validation module 116F may execute the authentication operations substantially as described above with respect to FIGS. 3-8.

At step 1116, the validation module 116F may transmit authentication data, such as an authentication result, CAVV, ECI, and/or the like, to the messaging module 104F. At step 1118, the messaging module 104F may forward the authentication data (e.g., ECI/CAVV) to the access request analyzer module 104E.

At step 1120, the access request analyzer module 104E may execute risk screening based on the received authentication data. The access request analyzer module 104E may execute risk screening based on the authentication data as described above with respect to FIG. 10.

At step 1124, the access request analyzer module 104E may transmit an authorization request message to the authorization computer 110. The authorization request message may comprise authentication data received from the authentication computer 116 (e.g., CAVV, ECI, authentication results, etc.). The authorization request message may further comprise information related to the risk screening conducted by the request analyzer module such as an access indicator, an access score, access data, etc.

At step 1126, the authorization computer executes authorization operations. The authorization computer may execute authorization operations substantially as described above with respect to step 1010 of FIG. 10. If the authorization computer 110 determines to reject, the authorization computer may transmit an authorization response message to the messaging module 104F indicating that access should be rejected.

At steps 1128 and 1132, the post authorization module 104J may execute, and send the results of, a post-authorization screening, substantially as described above with respect to steps 1012 and 1016 of FIG. 10.

E. Hybrid Screening With Exemptions

Figure 12:
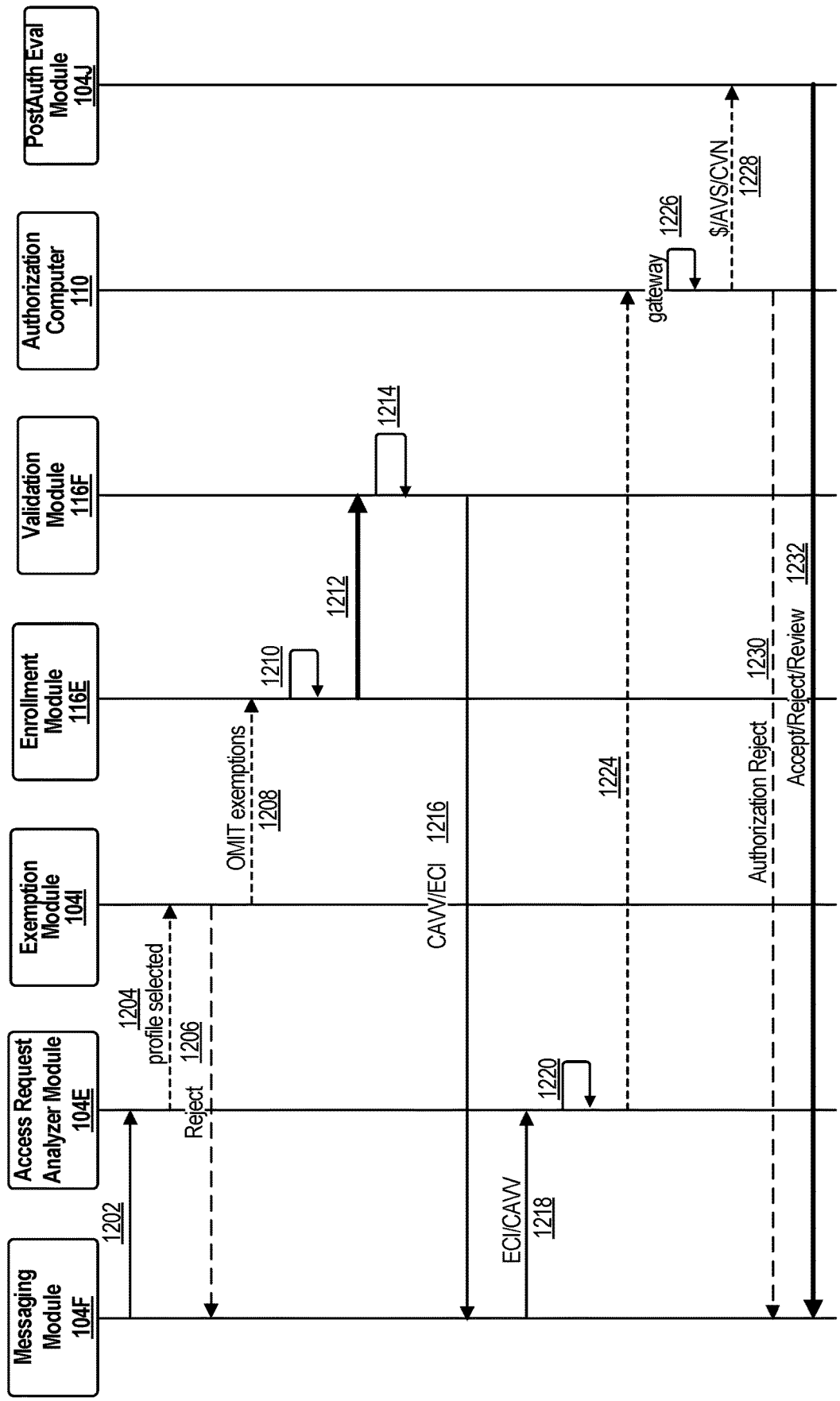
FIG. 12 shows an example set of operations for pre-authorization access request screening using an exemption with hybrid authentication, in accordance with some embodiments.

A method for hybrid pre-authorization access request screening with exemptions is described with respect to FIG. 12. The operations shown in FIG. 12 may be performed by the server computer 104, authentication computer 116, and authorization computer 110 shown in FIGS. 1-2B.

At step 1202, the messaging module 104F makes a call to the access request analyzer module 104E, as described above with respect to step 1002 of FIG. 10. The access request analyzer module 104E may then select and transmit a profile to the exemption module 104I at step 1204, as described above with respect to step 1004 of FIG. 10.

At step 1206, optionally, the system may reject the authorization request after the profile is selected, as described above with respect to step 1006 of FIG. 10.

At step 1208, the exemption module may determine that one or more exemptions applies. The exemption module may determine that an exemption applies by comparing the received profile and/or access data to exemption rules. However, the exemption module 104I may further determine that the exemption(s) should be omitted. The exemption module 104I may use access rules to determine that exemptions should be overruled in certain circumstances. For example, although a transaction is for less than 100 dollars, no exemption should apply if the transaction originates from China. Risk rules may be configured such that the system authenticates and uses the authentication results for further analysis. The exemption module 104I may then transmit a notification to the authentication computer indicating that the exemptions should be omitted.

Steps 1210-1232 may be performed in a substantially similar fashion as described above with respect to steps 1110-1132 of FIG. 11. Because the exemptions are omitted, the system may proceed substantially as if no exemptions apply.

F. Exemption Override

Figure 13:
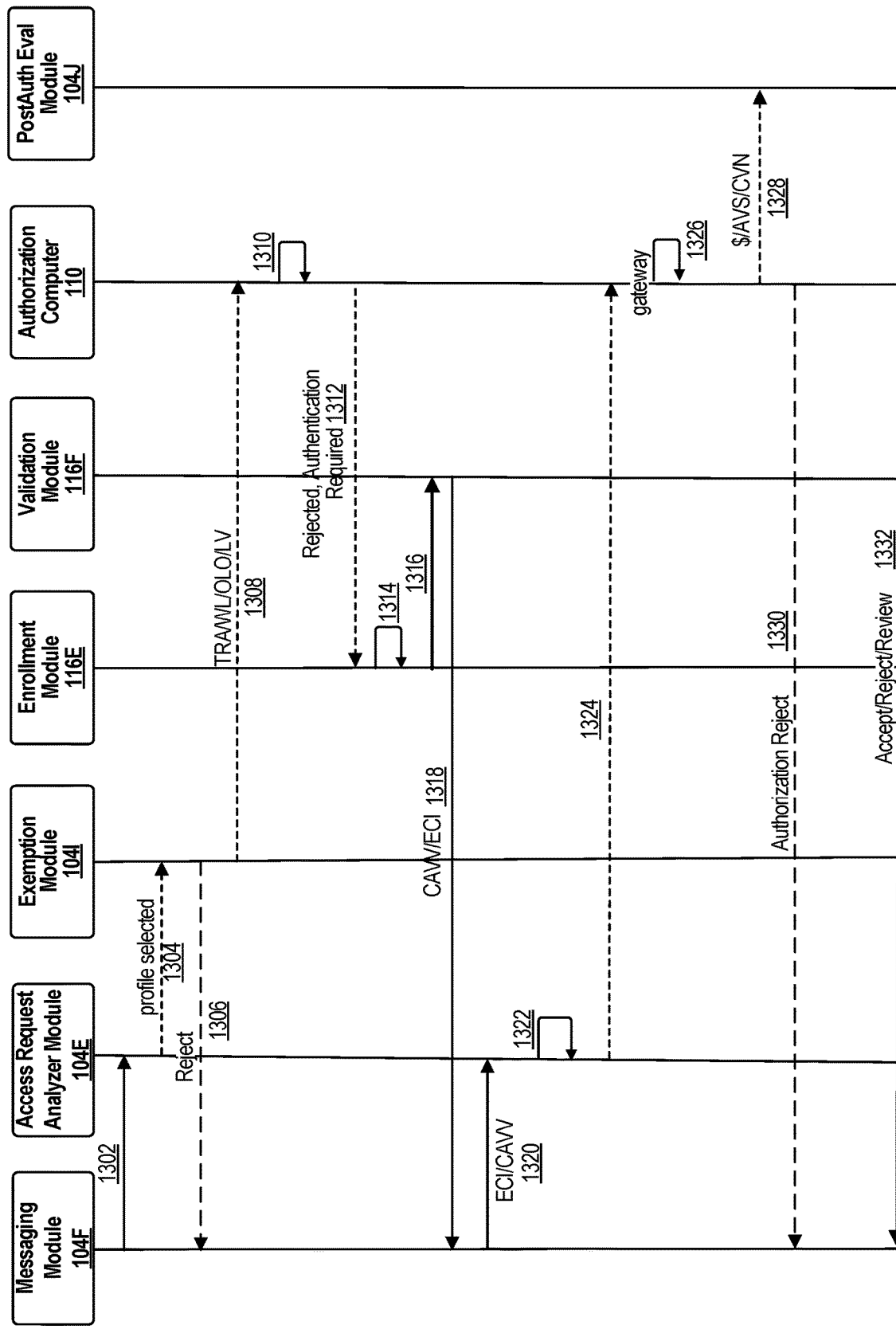
FIG. 13 shows an example set of operations for pre-authorization access request screening using an exemption override, in accordance with some embodiments.

A method for hybrid pre-authorization access request screening with exemptions overridden by the authentication computer is described with respect to FIG. 13. The operations shown in FIG. 13 may be performed by the server computer 104, authentication computer 116, and authorization computer 110 shown in FIGS. 1-2B.

At step 1302, the messaging module 104F makes a call to the access request analyzer module 104E, as described above with respect to step 1002 of FIG. 10. The access request analyzer module 104E may then select and transmit a profile to the exemption module 104I at step 1304, as described above with respect to step 1004 of FIG. 10.

At step 1306, optionally, the system may reject the authorization request after the profile is selected, as described above with respect to step 1006 of FIG. 10.

At step 1308, the exemption module may determine that one or more exemptions applies, as described above with respect to FIG. 12. The system may therefore transmit an authorization request message to the authorization computer 110 without first executing authentication operations. The authorization request message may include an indication that an exemption has been applied and/or that authentication has not been performed. The authorization request message may further include access data and other information about the access request.

At step 1310, the authorization computer 110 may analyze the received data. The authorization computer 110 may determine that authentication is required, based on rules of the authorization computer.

At step 1312, the authorization computer 110 may transmit a message to the enrollment module indicating that authentication is required. Based on the received message, the authentication computer may perform authentication operations before resubmitting an authorization request message indicating that authorization has been completed.

Steps 1314-1332 may be performed in a substantially similar fashion as described above with respect to steps 1110-1132 of FIG. 12.

V. ADVANTAGES

The teachings of this disclosure have a number of advantages. For example, an authorization computer can increase confidence and improve authorization rates by leveraging the access indicator in authorization decisions. With the assurance that a trusted entity has already screened the access request for fraud, issuers may be more inclined to authorize an access request. By decreasing unnecessary refusals to grant access, a user may be more motivated to make authorization requests through the corresponding channels. Further, increasing access may lead to increased revenue.

Additionally, by leveraging authentication data to make access determinations, the accuracy of those determinations can be improved. Authentication data, particularly risk-based authentication data, can be very useful in the computations used to execute fraud checks as well as authorizer-side risk checks. Many of these data elements are not typically available to the authorizing computer. Passing authentication details to the authorization computer also more clearly distinguishes the level of risk, enabling the authorization computer to fine-tune access determinations. Further, adding authentication and/or access details to a dedicated field of messages to the authorization computer can lead to improved compatibility with issuers' authorization risk engines.

As a result, the accuracy of fraud checks can be greatly increased. The methods described herein can both increase the number of fraudulent access attempts caught and decrease the number of false declines for access requests that are actually not fraudulent.

Embodiments of the disclosure have a number of additional examples. For example, the authorization computer can leverage the data and computations of the authorization computer and/or server computer in evaluating an access request. The authorization computer may be able to reduce or even eliminate the amount of computations required, saving time and computational resources. The authorization computer may be able to greatly reduce the amount of data storage required as well. Further, by leveraging the preexisting authorization request message to pass said data, there is no need to burden the system with additional messaging operations.

Although examples are described in the context of payment transactions, the methods described herein are applicable in other contexts. As an example, some embodiments may be used to determine whether to grant access to a secure lock box. As another example, some embodiments may be used to determine whether to allow a user to log into a secure website.

VI. COMPUTER SYSTEM

Figure 14:
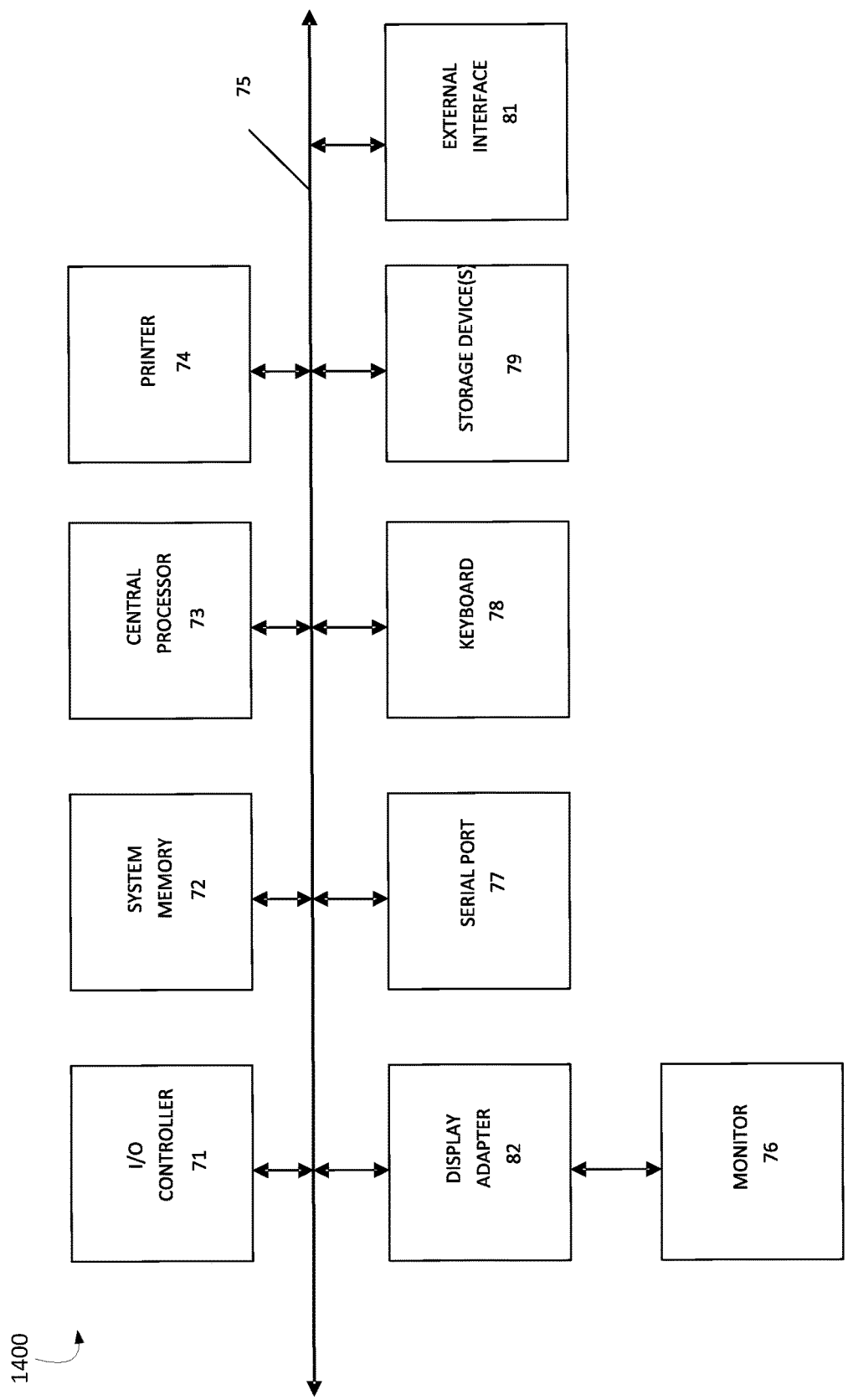
FIG. 14 shows a block diagram of a computer apparatus, in accordance with some embodiments.

FIG. 14 is a high level block diagram of a computer system 1400 that may be used to implement any of the entities or components described above.

The subsystems shown in FIG. 14 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art, such as serial port 77. For example, serial port 77 or external interface 81 (e.g., Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

It should be understood that any of the embodiments can be implemented in the form of control logic using hardware (e.g., an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the disclosure. However, other embodiments may be directed to specific embodiments relating to each individual aspect, or specific combinations of these individual aspects.

The above description is illustrative and is not restrictive. Many variations will become apparent to those skilled in the art upon review of the disclosure. The scope should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, by a server computer from a requesting device, a request for access to a resource to a user device, the request comprising access data;
   determining, by the server computer, an access score based on the access data;
   identifying a first threshold value corresponding to access requests that should be approved;
   identifying a second threshold value corresponding to access requests that should be declined;
   comparing the access score to the first threshold value and the second threshold value; and
   determining that the access score exceeds the first threshold value and the second threshold value;
   generating, by the server computer, an access indicator based on the access score;
   preparing, by the server computer, an authorization request message comprising the access indicator; and
   transmitting, by the server computer to an authorization computer, the authorization request message comprising the access indicator,
   wherein the authorization computer approves or declines the access to the resource to the user device based on the access indicator comprised in the authorization request message.

2. The method of claim 1, wherein the access indicator comprises a flag indicating that the server computer has approved the access request.

3. The method of claim 1, further comprising:
   receiving, by the server computer from an authentication computer, authentication data.

4. The method of claim 3, wherein the server computer further uses at least a subset of the authentication data for determining the access score.

5. The method of claim 3, wherein: the authorization computer further uses the authentication data for determining whether to approve or decline the access to the resource.

6. The method of claim 3, wherein: the authentication data comprises an authentication code indicating an authentication result and an authentication cryptogram; and
   the authorization request message further comprises the authentication code and the authentication cryptogram.

7. The method of claim 3, wherein: the authentication data comprises supplemental data; and
   the authorization request message further comprises the supplemental data.

8. The method of claim 3, further comprising:
   analyzing, by the server computer, the access data in comparison to a plurality of exemptions, wherein if one or more of the plurality of exemptions applies to the access data, authorization is not required; and
   based on the access data, determining, by the server computer, that no exemptions apply to the access request.

9. The method of claim 1, wherein the access indicator is transmitted in an open data field of the authorization request message.

10. The method of claim 1, further comprising:
    analyzing, by the server computer, the access data in comparison to a plurality of exemptions, wherein if one or more of the plurality of exemptions applies to the access data, authorization is not required;
    based on the access data, determining, by the server computer, that one or more exemptions apply to the access request; and
    based on the determination, transmitting the authorization request message without executing authorization operations.

11. A server computer comprising:
    a processor; and
    a non-transitory computer-readable medium coupled to the processor, the non-transitory computer-readable medium comprising code, executable by the processor, to implement operations comprising:
    determining an access score based on access data obtained from a request for access to a resource to a user device;
    identifying a first threshold value corresponding to access requests that should be approved;
    identifying a second threshold value corresponding to access requests that should be declined;
    comparing the access score to the first threshold value and the second threshold value; and
    determining that the access score exceeds the first threshold value and the second threshold value;
    generating an access indicator based on the access score;
    preparing an authorization request message comprising the access indicator; and
    transmitting, to an authorization computer, the authorization request message comprising the access indicator,
    wherein the authorization computer approves or declines the access to the resource to the user device based on the access indicator comprised in the authorization request message.

12. The server computer of claim 11, the operations further comprising:
  receiving authentication data, wherein the server computer further uses at least a subset of the authentication data for determining the access score.

13. The server computer of claim 12, wherein the server computer further uses at least a subset of the authentication data for determining the access score.

14. A method comprising:
  receiving, by a server computer from a requesting device, a request for access to a resource to a user device, the request comprising access data;
  transmitting, by the server computer to an authentication computer, an authentication request message comprising at least a subset of the access data;
  receiving, by the server computer from the authentication computer, an authentication response message comprising authentication data corresponding to a level of authentication of the user device by the authentication computer, wherein the authentication computer generated the authentication data based on the access data;
  determining, by the server computer, an access score based on the authentication data and the access data;
  analyzing, by the server computer, the access data in comparison to a plurality of exemptions, wherein if one or more of the plurality of exemptions applies to the access data, authorization is not required; and
  based on the access data, determining, by the server computer, that no exemptions apply to the access request; and
  determining, by the server computer based on the access score, whether to transmit an authorization request message to an authorization computer.

15. The method of claim 14, further comprising:
  generating an access indicator based on the access score; and
  transmitting the access indicator to the authorization computer,
  wherein the authorization computer approves or declines the access to the resource based on the access indicator.

16. The method of claim 15, wherein the access indicator is transmitted in an open data field of the authorization request message.

17. The method of claim 15, wherein the access indicator comprises a flag indicating that the server computer has approved the access request.

18. The method of claim 15, further comprising:
  transmitting the access score to the authorization computer,
  wherein the authorization computer approves or declines the access to the resource based on the access score.

* * * * *